United States Patent
Hess et al.

(10) Patent No.: US 10,649,879 B2
(45) Date of Patent: May 12, 2020

(54) INTEGRATION OF DIAGNOSTIC INSTRUMENTATION WITH MACHINE PROTECTION SYSTEM

(71) Applicant: Bently Nevada, LLC, Minden, NV (US)

(72) Inventors: Dustin Hess, Minden, NV (US); Michael Alan Tart, Gardnerville, NV (US); Paul Richetta, Gardnerville, NV (US); Curtis Hoffman, Gardnerville, NV (US); Raymond Jensen, Gardnerville, NV (US)

(73) Assignee: Bently Nevada, LLC, Minden, NV (US)

( * ) Notice: Subject to any disclaimer, the term of this patent is extended or adjusted under 35 U.S.C. 154(b) by 216 days.

(21) Appl. No.: 15/947,765

(22) Filed: Apr. 6, 2018

(65) Prior Publication Data
US 2019/0310928 A1 Oct. 10, 2019

(51) Int. Cl.
| G06F 11/00 | (2006.01) |
| G06F 11/34 | (2006.01) |
| G05B 19/4065 | (2006.01) |
| G05B 19/418 | (2006.01) |

(52) U.S. Cl.
CPC ........ *G06F 11/349* (2013.01); *G05B 19/4065* (2013.01); *G05B 19/4185* (2013.01); *G05B 2219/31449* (2013.01); *G05B 2219/33328* (2013.01)

(58) Field of Classification Search
CPC .............................. G06F 11/349; G06F 11/30
See application file for complete search history.

(56) References Cited

U.S. PATENT DOCUMENTS

| 2003/0115369 | A1* | 6/2003 | Walter | H04L 12/4035 709/253 |
| 2015/0026622 | A1* | 1/2015 | Roaldson | G06F 3/0484 715/771 |
| 2019/0310607 | A1* | 10/2019 | Tart | G05B 19/4185 |
| 2019/0310619 | A1* | 10/2019 | Clemens | G06F 13/4072 |

\* cited by examiner

*Primary Examiner* — Charles Ehne
(74) *Attorney, Agent, or Firm* — Mintz Levin Cohn Ferris Glovsky and Popeo, P.C.

(57) ABSTRACT

In one embodiment, a portable monitoring system can include a secondary bus and a first monitoring circuit detachably coupled to the secondary bus. The first monitoring circuit can be configured to receive, from a first bus via a node comprising one or more gates, a first beacon packet of a monitoring system of an industrial machine. The first beacon packet can include a first system frame schedule indicative of a plurality of time slices during which a plurality of data packets can be configured to be broadcasted on the first bus of the monitoring system. The first monitoring circuit can also be configured to determine, a first set of time slices of the plurality of time slices during which a first set of data packets including data characterizing one or more predetermined operating parameters are broadcasted on the first bus. The first monitoring circuit can be further configured to transfer the first set of data packets from the first bus to the first monitoring circuit by activating the one or more gates in the node during a first set of time slices of the plurality of time slices. The one or more gates are configured to prevent transfer of an outgoing data packet to the first bus.

20 Claims, 11 Drawing Sheets

INTEGRATION OF DIAGNOSTIC INSTRUMENTATION WITH MACHINE PROTECTION SYSTEM

BACKGROUND

Many industries, such as hydrocarbon refining and power generation, can rely heavily upon operation of machinery, and in some instances, continuous operation of machinery. In these environments, failure of one or more machines can incur significant costs due to repair expenses as well as loss of production and potential injury to workers. Given these risks, it can be common to monitor certain operating parameters of one or more machine components. Measurements of the operating parameters can provide an indication of the mechanical condition of a machine component, allowing preventative maintenance (e.g., repair, replacement, etc.) to be performed on the machine component prior to failure. This monitoring can provide one or more long term benefits, such as lower production costs, reduced equipment down time, improved reliability, and enhanced safety.

SUMMARY

In general, apparatus, systems, methods and article of manufacture for flexible condition monitoring of industrial machines.

In one embodiment, a condition monitoring circuit can include a circuit controller and a node. The node can include a gate controller, a node controller and one or more gates. The node can be configured to detachably couple to a bus of a monitoring system associated with an industrial machine. The circuit controller can be configured to identify an operating parameter associated with the industrial machine. The gate controller can be configured to transfer, via the one or more gates, one or more data packets including data characterizing the operating parameter from the bus in the monitoring system. The one or more gates can be configured to prevent transfer of an outgoing data packet to the bus via the node.

One or more of the following features can be included in any feasible combination.

In one embodiment, the one or more gates include a unidirectional data flow circuit, the unidirectional data flow circuit prevents transfer of the outgoing data packet to the bus via the one or more gates. In another embodiment, the gate controller can configure the one or more gates in the node to transmit the one or more data packets from the bus in the monitoring system to the node controller. The gate controller can provide a control signal to a gate of the one or more gates. The gate transmits a data packet of the one or more data packets from the bus in the monitoring system based on the control signal. In yet another embodiment, the condition monitoring circuit can be configured to detachably couple to the bus in the monitoring system.

In one embodiment, the gate controller can be configured to transfer the one or more data packets by receiving a beacon packet from the bus. The beacon packet can include a system frame schedule of the monitoring system. The system frame schedule can be indicative of a first plurality of time slices during which the one or more data packets including the data characterizing the operating parameter are broadcasted on the bus. The gate controller can be configured to configure the node to transfer the one or more data packets from the bus during the first plurality of time slices.

In one embodiment, the gate controller can be configured to transfer a plurality of data packets broadcasted on the bus to the node controller. The node controller can be configured to select, from the transferred plurality of data packets, the one or more data packets including data characterizing the operating parameter by at least identifying the one or more data packets based on unique identifiers contained within the one or more data packets.

In one embodiment, the operating parameter can be identified based on a request from a condition monitoring system. In another embodiment, the circuit controller can be further configured to determine a condition monitoring parameter indicative of an operational status of the industrial machine based on the data characterizing the operating parameter.

In one embodiment, the condition monitoring unit can include a memory configured to store the one or more data packets including data characterizing the operating parameter. In another embodiment, the circuit controller can be further configured to calculate at least a portion of a condition monitoring parameter calculation. In yet another embodiment, the circuit controller can be configured to communicate with a data collection software. The data collection software can include a condition monitoring software operating in a server and configured to monitor the operation of the industrial machine. In one implementation, the circuit controller can be configured to execute at least a portion of the condition monitoring software.

In one embodiment, a method can include identifying an operating parameter associated with an industrial machine. The method can also include transferring, via one or more gates in a node, one or more data packets including data characterizing the operating parameter from a bus in a monitoring system associated with the industrial machine. The one or more data packets can be broadcasted on the bus by one or more monitoring circuits of the monitoring system. The one or more gates can be configured to prevent transfer of an outgoing data packet to the bus via the node. The method can further include providing the data characterizing the operating parameter to a condition monitoring system.

One or more of the following features can be included in any feasible combination.

In one embodiment, the one or more gates can include a unidirectional data flow circuit, the unidirectional data flow circuit prevents transfer of the outgoing data packet to the bus via the one or more gates. In another embodiment, the method can further include determining a condition monitoring parameter indicative of an operational status of the industrial machine based on the data characterizing the operating parameter.

In one embodiment, transferring the one or more data packets can include receiving a beacon packet from the bus, wherein the beacon packet includes a system frame schedule of the monitoring system, the system frame schedule indicative of a first plurality of time slices during which the one or more data packets including the data characterizing the operating parameter are broadcasted on the bus. The transferring the one or more data packets can also include configuring the node to transfer the one or more data packets from the bus during the first plurality of time slices.

In one embodiment, transferring the one or more data packets can include transferring data packets broadcasted on the bus, and selecting, from the transferred data packets, the one or more data packets including data characterizing the operating parameter by at least identifying the one or more data packets based on unique identifiers contained within the transferred data packets.

In one embodiment, the node can include a node controller and a gate controller. The gate controller can configure the one or more gates in the node to transmit the one or more data packets from the bus in the monitoring system to the node controller. In another embodiment, the gate controller can provide a control signal to a gate of the one or more gates. The gate can transmit a data packet of the one or more data packets from the bus in the monitoring system based on the control signal.

In one embodiment, a condition monitoring circuit can include the node and a circuit controller. The condition monitoring circuit can be detachably coupled to the bus in the monitoring system. In another embodiment, the operating parameter can be identified by the circuit controller. In yet another embodiment, the operating parameter can be identified based on a request from the condition monitoring system.

In one embodiment, a portable monitoring system can include a secondary bus and a first monitoring circuit detachably coupled to the secondary bus. The first monitoring circuit can be configured to receive, from a first bus via a node comprising one or more gates, a first beacon packet of a monitoring system of an industrial machine. The first beacon packet can include a first system frame schedule indicative of a plurality of time slices during which a plurality of data packets can be configured to be broadcasted on the first bus of the monitoring system. The first monitoring circuit can also be configured to determine, a first set of time slices of the plurality of time slices during which a first set of data packets including data characterizing one or more predetermined operating parameters are broadcasted on the first bus. The first monitoring circuit can be further configured to transfer the first set of data packets from the first bus to the first monitoring circuit by activating the one or more gates in the node during a first set of time slices of the plurality of time slices. The one or more gates are configured to prevent transfer of an outgoing data packet to the first bus.

One or more of the following features can be included in any feasible combination.

In one embodiment, the first monitoring circuit can be further configured to set a second reference time of the portable monitoring system based on a first reference time of the monitoring system. The plurality of time slices can be temporally arranged relative to the first reference time. The first reference time of the monitoring system can be included in the beacon packet. In another embodiment, the plurality of data packets can be broadcasted on the first bus by one or more monitoring circuits communicatively coupled to the first bus.

In one embodiment, the first set of data packets including data characterizing one or more predetermined operating parameters can include unique identifiers indicative of the one or more predetermined operating parameter. In another embodiment, activating the one or more gates in the node can include sending a control signal to the one or more gates. The control signal can be configured to set the one or more gates in a first operational mode in which data packets broadcasted on the first bus are transferred to the portable monitoring system.

In one embodiment, the one or more gates can include a unidirectional data flow circuit, the unidirectional data flow circuit can prevent transfer of the outgoing data packet to the first bus via the one or more gates. In another embodiment, the portable monitoring system of claim 1, can be further configured to receive data characterizing sensor measurement by one or more sensors coupled to the industrial machine. The data characterizing sensor measurement can include a detected operational parameter value and time associated with the detected operational parameter. In yet another embodiment, the portable monitoring system can be further configured to determine an operation status of the industrial machine based on the received data characterizing sensor measurement and the received data characterizing one or more predetermined operating parameters.

In one embodiment, the portable monitoring system can further include an input monitoring circuit detachably coupled to the secondary bus. The input monitoring circuit can be configured to receive data characterizing sensor measurement. The portable monitoring system can also include a processing circuit detachably coupled to the secondary bus which can be configured to determine an operation status of the industrial machine.

In one embodiment, a method can include receiving, from a first bus via a node comprising one or more gates, a first beacon packet of a monitoring system of an industrial machine. The first beacon packet can include a first system frame schedule indicative of a plurality of time slices during which a plurality of data packets can be configured to be broadcasted on the first bus of the monitoring system. The method can also include determining, a first set of time slices of the plurality of time slices during which a first set of data packets including data characterizing one or more predetermined operating parameters are broadcasted on the first bus. The method can further include transferring the first set of data packets from the first bus to a monitoring circuit of a portable monitoring system by activating the one or more gates in the node during the first set of time slices of the plurality of time slices. The one or more gates can be configured to prevent transfer of an outgoing data packet to the first bus.

One or more of the following features can be included in any feasible combination.

In one embodiment, the method can further include setting a second reference time of the portable monitoring system based on a first reference time of the monitoring system. The plurality of time slices can be temporally arranged relative to the first reference time. The first reference time of the monitoring system can be included in the beacon packet. In another embodiment, the plurality of data packets can be broadcasted on the first bus by one or more monitoring circuits communicatively coupled to the first bus. In yet another embodiment, the first set of data packets including data characterizing one or more predetermined operating parameters an include unique identifiers indicative of the one or more predetermined operating parameter.

In one embodiment, activating the one or more gates in the node can include sending a control signal to the one or more gates. The control signal can be configured to set the one or more gates in a first operational mode in which data packets broadcasted on the first bus are transferred to the portable monitoring system. In another embodiment, the one or more gates can include a unidirectional data flow circuit. The unidirectional data flow circuit prevents transfer of the outgoing data packet to the first bus via the one or more gates. In yet another embodiment, the method can further include receiving data characterizing sensor measurement by one or more sensors coupled to the industrial machine. The data characterizing sensor measurement can include a detected operational parameter value and time associated with the detected operational parameter.

In one embodiment, the method can further include determining an operation status of the industrial machine based on the received data characterizing sensor measurement and the received data characterizing one or more predetermined operating parameters. In another embodiment, the receiving, the determining and transferring can be performed by the monitoring circuit in the portable monitoring system.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Figure 1A:
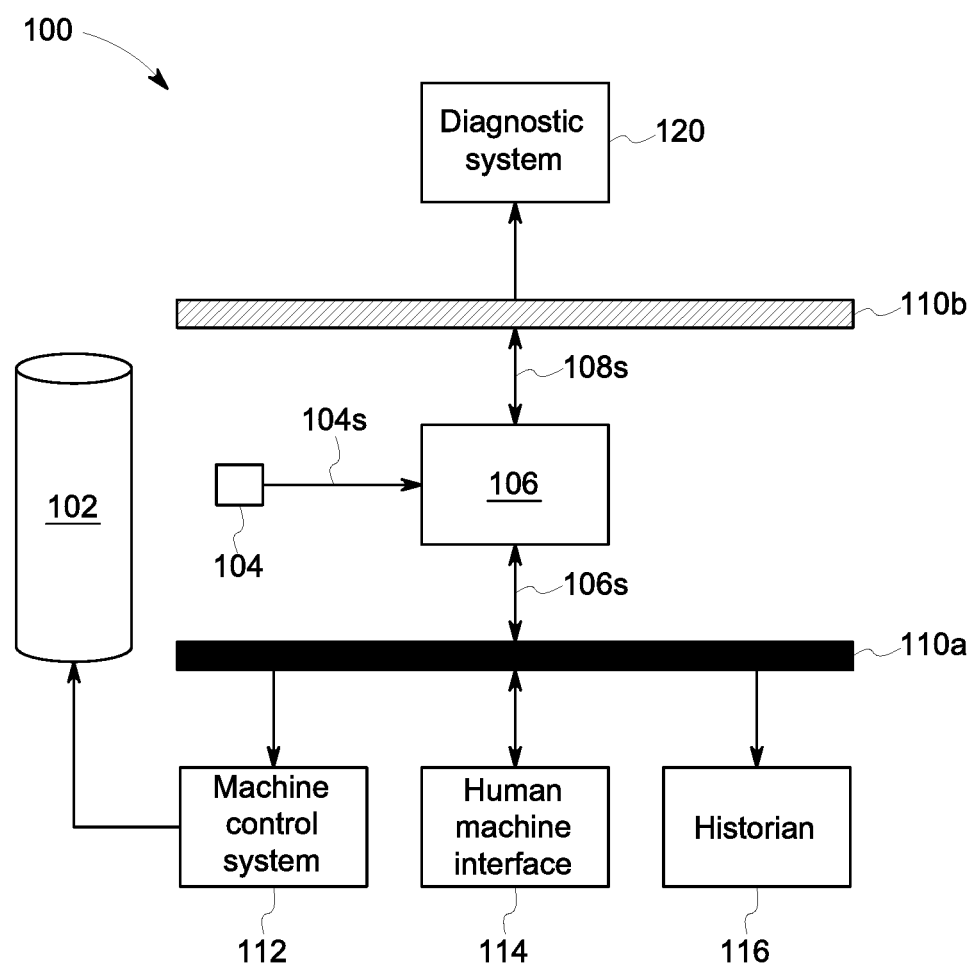
FIG. 1A is a diagram illustrating one exemplary embodiment of an operating environment containing an existing monitoring system.

Industrial machines can be complex with multiple operational states and multiple operational parameters. A monitoring system can monitor the operation of a complex industrial machine and take necessary actions to ensure that the machine is operating as desired. For example, the monitoring system can detect the operational state and/or the operational parameters of the machine (e.g., via multiple sensors coupled to the machine). The monitoring system can provide condition monitoring wherein the monitoring system can notify a user of the operating conditions of the machine. Additionally or alternately, the monitoring system can provide protection monitoring wherein the monitoring system can shut the machine down when the detected operational parameters of the machine exceed a threshold value.

A monitoring system with condition monitoring capabilities can require an expensive infrastructure (e.g., a server) with a large processing power and/or large memory. It may not be feasible to establish an expensive and/or a bulky infrastructure for some monitoring systems (e.g., remotely located monitoring systems, monitoring systems of a facility with few industrial machines, and the like). This can be obviated by installing the condition monitoring system (e.g., condition monitoring software) at a remote server that can perform condition monitoring for multiple monitoring systems. However, having a remote condition monitoring system that can communicate with the monitoring system can leave the monitoring system susceptible to hacking and/or malware. This application provides for a condition monitoring circuit that can act as a liaison between the monitoring system and the condition monitoring system (e.g., remotely deployed). The condition monitoring circuit can be designed to transfer data (e.g., sensor data) from the monitoring system to the condition monitoring system but prevent a transfer of data to the monitoring system. In an embodiment, the transfer of data can be in one direction, from the monitoring system to the condition monitoring system, but not in the other direction, from the condition monitoring system to the monitoring system. This can prevent an unauthorized user from altering/corrupting the operation of the monitoring system.

A monitoring system can require one or more operational parameters of the machine in order to provide condition monitoring and/or protection monitoring to the machine. These operational parameters can be obtained via one or more machine sensors that can detect the operational parameters and provide them to the monitoring system. However, while monitoring the machine, it may be determined that additional operational parameters of the machine are required that may not be available to the monitoring system. For example, the machine sensors may be incapable of detecting the additional operational parameters. Furthermore, the machine can be remotely located and it may be cumbersome to reconfigure the monitoring system to detect the additional operational parameter. This can be obviated by using a portable monitoring system present in the vicinity of the machine that can detect the additional operating parameters and can allow for condition/protection monitoring. However, having a portable monitoring system that can communicate with the monitoring system can leave the monitoring system susceptible to hacking and/or malware in some instances. This application provides for a condition monitoring circuit that can act as a liaison between the monitoring system and the condition monitoring system (e.g., remotely deployed). The condition monitoring circuit can be designed to transfer data from the monitoring system to the condition monitoring system but prevent a transfer of data to the monitoring system. In an embodiment, the transfer of data can be in one direction, from the monitoring system to the condition monitoring system, but not in the other direction, from the condition monitoring system to the monitoring system. This can prevent an unauthorized user from altering/corrupting the operation of the monitoring system.

Embodiments of systems and corresponding methods for monitoring industrial machines are discussed herein. However, embodiments of the disclosure can be employed for monitoring other machines without limit.

An operating environment 100 containing an existing monitoring system is illustrated in FIG. 1. The operating environment 100 can include a target 102, at least one sensor 104, and a monitoring system 106 in communication with the sensor 104, an internal network 110a, and an external network 110b.

The target 102 can be any component of any machine. Examples of the target 102 can include gears, bearings, and shafts, amongst others. Examples of machines can include turbomachines, turbines (e.g., hydro, wind), generators, and reciprocating compressors.

The sensor 104 can be configured to sense an operating parameter of the target 102, to generate at least one sensor signal 104s representing the measured operating parameter, and to transmit the sensor signal 104s to the monitoring system 106 (e.g., via field wiring). As an example, the sensor 104 can include a probe, a transducer, and a signal conditioning circuit (not shown). The probe can interact with the target 102 for measurement of the operating parameter. The transducer can convert measurements of the operating parameter into an electrical signal (e.g., a voltage). The signal conditioning circuit can condition and/or amplify the electrical signal to generate the sensor signal 104s (e.g., a voltage ranging between a minimum and maximum). Thus, in one aspect, the sensor signal 104s can contain the direct or raw measurement made by the sensor transducer. The sensor signal 104s can be an analog signal or a digital signal.

In another aspect, the sensor signals 104s can also include an enhanced data set, in addition to the direct measurements of the operating parameter. The enhanced data set can contain a variety of measured variables that depend upon the type of operating parameter being measured. As an example, the target 102 can be a rotating component, such as a shaft, and radial vibration can be a variable measured by a sensor 104 in the form of a proximity sensor. Under these circumstances, the enhanced data set can include one or more of a gap voltage, a 1× filtered amplitude, a 2× filtered amplitude, a 1× filtered phase, a 2× filtered phase, Not 1× amplitude, and maximum shaft displacement (Smax). Gap voltage is the voltage output by the probe and represents the physical distance between the target 102 and a tip of the probe. 1× amplitude is the amplitude of vibrations having the same frequency as the shaft rotation, while 2× amplitude is the amplitude of vibrations having a frequency twice that of the shaft rotation. For instance, a rotation speed of 1480 revolutions per minute corresponds to a frequency of $24.6\overline{6}$ cycles per second (Hz). Phase is the time delay between a vibration measured at a predetermined measurement location with respect to a reference location. Thus, 1× phase refers to phase of vibrations having the same frequency as the shaft rotation, while 2× phase refers to phase of vibrations having a frequency twice that of the shaft rotation. Not 1× amplitude refers to all amplitudes except for the 1× amplitude. In other embodiments, the enhanced data set can include metadata regarding one or more components of the sensor 104, such as the transducer. Examples of metadata can include one or more of a serial number, revision number, operating temperature, and state of health.

The number and type of sensor 104 can be dictated by the operating parameter(s) that are intended to be measured. In one aspect, the sensor 104 can take the form of one or more proximity probes for measurement of vibration, position, speed, direction of motion, and eccentricity. In another aspect, the sensor 104 can take the form of one or more accelerometers for measurement of seismic vibration and acceleration. In a further aspect, the sensor 104 can take the form of one or more temperature probes or pressure probes for measurement of temperature and pressure, respectively. It can be understood that the sensor types and corresponding operating parameters listed above are not exhaustive and embodiments of the sensor 104 can include any sensor or combination of sensors suitable for measurement of operating parameters of interest.

In use, the monitoring system 106 can be configured to process the received sensor signals 104s and output monitoring signals 106s, 108s. As an example, the monitoring system 106 can be configured to determine a value characterizing an operating parameter measurement. The monitoring system 106 can also compare this determined value, and/or any measured variables of the enhanced data set, to one or more corresponding predetermined alarm conditions in real-time and determine an alarm status (e.g., OK, not OK, alert, danger, etc.). For instance, when the target 102 is a rotating shaft and the measured operating parameter is radial vibration of the shaft, the sensor signal 104s can include measurements of displacement of the shaft as a function of time. From the sensor signal 104s, the monitoring system 106 can determine the value of vibration amplitude from the peak-to-peak displacement.

The monitoring system 106 can also be configured to output monitoring signals 106s, 108s to the internal network 110a and/or the external network 110b. The output monitoring signals 106s, 108s can include one or more of the measured variables of the enhanced data set, the determined values, and the determined status. Alarm statuses, such as alert and danger, can be annunciated via physical relays on the monitoring system 106 or to the external systems 110 by the monitoring signals 106s, 108s. In another aspect, the monitoring system 106 can additionally or alternatively store the sensor signals 104s for later processing.

The internal network 110a can be a plant network that is in communication with a machine control system 112. The machine control system 112 can be configured to provide commands to a machine operative to control one or more operating parameters of the target 102. The internal network 110a can also be in communication with other systems, such as computing devices executing configuration software (not shown), human-machine interfaces (HMIs) 114 and/or a customer historian 116. The configuration software can be used to provide configuration information, such as the pre-determined alarm conditions, to the monitoring system 106. The HMI 114 can be one or more computing devices in communication with user interface devices (e.g., displays) allowing an operator of the machine to review measured operating parameters and/or provide instructions to the machine control system 112.

So configured, the monitoring system 106 can facilitate protection of a machine containing the target 102. As an example, in response to annunciation of an alarm status, the machine control system 112 can be utilized to control operation of the target 102 (e.g., automatically according to programmed logic or manually using the HMI 114) to cause the measured operating parameters to change and move out of the alarm status. Under extreme circumstances, the machine control system 112 can be employed to shut down operation of the machine to protect the target 102 from damage and/or workers from injury. The historian 116 can store any of the data contained within the monitoring signals 106s.

The external network 110b can be a business network that is in communication with a diagnostic system 120. The diagnostic system 120 can analyze any of the data contained within the monitoring signals 108s received from the monitoring system 106 to diagnose improper operation of the target 102 and/or predict improper operation of the target 102 before it occurs. Thus, by providing monitoring signals 108s to the external network 110b, the monitoring system 106 can facilitate condition monitoring of the target 102.

Figure 1B:
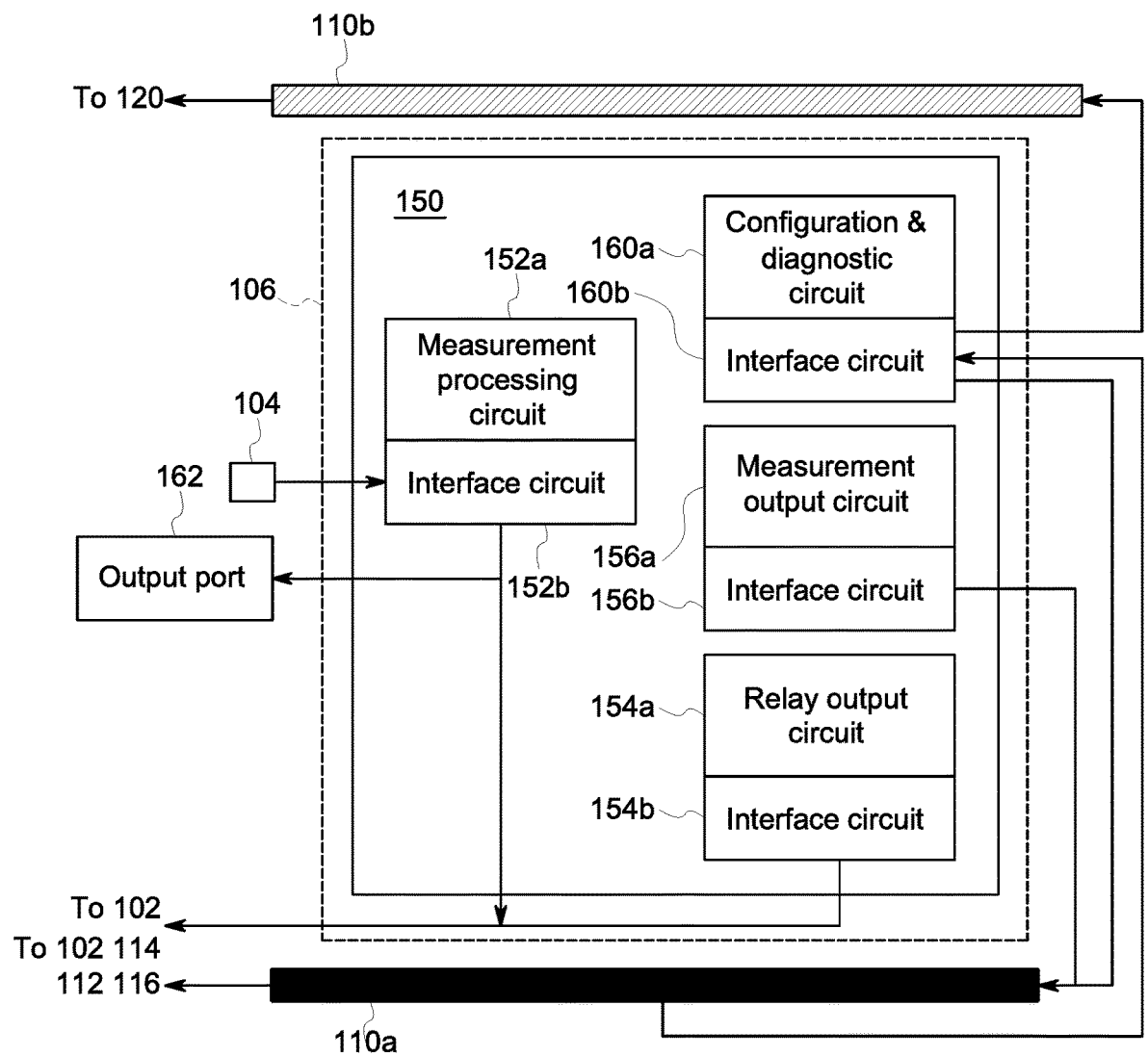
FIG. 1B is a diagram illustrating one exemplary embodiment of a backplane of the monitoring system of FIG. 1A.

The monitoring system 106 is illustrated in greater detail in FIG. 1B. As shown, the monitoring system 106 includes a backplane 150 that can be configured to allow communication between different components coupled thereto. The components can include a measurement processing circuit 152*a*, a relay output circuit 154*a*, a measurement output circuit 156*a*, a configuration and diagnostic circuit 160*a*, and corresponding interface circuits 152*b*, 154*b*, 156*b*, 160*b*. The interface circuits 152*b*, 154*b*, 156*b*, 160*b* can provide hardware interfaces for communication to and from their respective circuits 152*a*, 154*a*, 156*a*, 160*a*. The individual circuits 152*a*, 154*a*, 156*a*, 160*a* can communicate selected information on the backplane 150 using protocols running on busses formed from passive traces extending across the backplane 150.

In one aspect, the measurement processing circuit 152*a* can be coupled to an interface circuit 152*b* such that sensor signals 104*s* received by the interface circuit 152*b* are transmitted directly to the measurement processing circuit 152*a*. That is, the sensor signals 104*s* are not transmitted to the backplane 150. The sensor signals 104*s* can be accessed by an operator through an output port 162. Multiple measurement processing circuits 152*a* and interface circuit 152*b* can be present, on a one-to-one basis, for receipt of the sensor signals 104*s*. As discussed above, the measurement processing circuit 152*a* can be configured to determine one or more values for the operating parameter measurements contained within the received sensor signal 104*s*. The measurement processing circuit 152*a* can also compare determined values, and/or measured variables of the enhanced data, to pre-determined alarm conditions in real-time and determine a status for the target 102. The measurement processing circuit 152*a* can further output signals representing the measured variables of the enhanced data, the determined values, and the determined statuses to the backplane 150.

The measurement processing circuit 152*a* can also format process variables (e.g., determined values, measured variables of the enhanced data set, annunciated alarms, etc.) for output to the machine control system 112. As an example, the format can be a current that ranges between about 4 mA to about 20 mA (also referred to as 4-20) and is proportional to the determined values and/or measured variable as compared to a corresponding scale. The machine control system 112 can utilize the process variables for process control of the target 102.

The statuses determined by the measurement processing circuits 152*a* can be retrieved by the relay processing circuit 154*a* from the backplane 150. The relay processing circuit 154*a* can include relays that are programmed to actuate based upon received alarm statuses to annunciate an alarm. In one example, relays can actuate based upon a single status. In another example, relays can actuate based upon Boolean expressions (e.g., AND or voting) that combine two or more statuses. The relay processing circuit 154*a* can also output signals representing annunciated alarms directly to the machine control system 112 for process control of the target 102. As an example, the machine control system 112 can shut down operation of the target 102 upon receipt of an alarm annunciation. Annunciated alarms can also be used to provide indications and/or to drive into digital input of the machine control system 112, the HMI 114, or historian 116.

The measurement output circuit 156*a* can retrieve data such as determined values, measured variables of the enhanced data, determined statuses, and annunciated alarms from the backplane 150 for transmission to the internal network 110*a*. Upon receipt, the retrieved data can be stored by the historian 116 and/or reviewed by an operator using the HMI 114.

The configuration and diagnostic circuit 160*a* can receive first configuration commands from the internal network 110*a* and transmit the first configuration commands to the backplane 150 for use by the circuits 152*a*, 154*a*, 156*a*, 160*a*. The first configuration commands can provide one or more set points for use by the measurement processing circuit 152*a* in determining statuses. The first configuration commands can also provide logic instructions and identify statuses to be used by the relay output circuit 154*a* for alarm annunciation. The first configuration commands can further identify data such as determined values, measured variables of the enhanced data, determined statuses, and/or annunciated alarms to be retrieved from the backplane 150 by the measurement output circuit 156*a* and transmitted to the internal network 110*a*.

The configuration and diagnostic circuit 160*a* can also receive second configuration commands from the internal network 110*a*. The second configuration commands can identify data such as determined values, measured variables of the enhanced data, determined statuses, and annunciated alarms to be retrieved from the backplane 150 and transmitted to the external network 110*b* for use by the diagnostic system 120.

While capable of facilitating protection monitoring and condition monitoring of the target 102, in some instances, the architecture of monitoring systems such as monitoring system 106 can lack flexibility. In one aspect, placement of the configuration and diagnostic circuit 160*a* in communication with both the internal and external networks 110*a*, 110*b* can cause delays when updating the second configuration commands. When diagnosing machine problems, it can be desirable to change the data received by the diagnostic system 120. However, transmissions to or from components in communication with the internal network 110*a* can be strictly regulated in order to protect the machine control system 112 from unauthorized access. This regulation can include permitting the configuration and diagnostic circuit 160*a* to transmit data to the external network 110*b* for condition monitoring but prohibiting transmission of changes to the second commands from the external network 110*b* to the configuration and diagnostic circuit 160*a*. Instead, an authorized operator of the machine control system 112 can be required to approve any changes to the second configuration commands and transmit the updated second conditioning commands from the internal network 110*a* to the configuration and diagnostic circuit 160*a*.

In another aspect, directly coupling the interface circuit 152*b* receiving the sensor signals 104*s* to the measurement processing circuit 152*a* can limit access of the sensor signal 104*s* to only the measurement processing circuit 152*a*. As a result, the other circuits 154*a*, 156*a*, 160*a* of the monitoring system 106, as well as the diagnostic system 120, cannot utilize the raw operating parameter measurements transmitted by the sensor signal 104*s*. Furthermore, should a second measurement processing circuit (not shown) be added to the monitoring system for receipt of additional sensor signals from another sensor, each measurement processing circuit could utilize the operating parameter measurements it receives but not operating parameters received by the other.

In a further aspect, process variables output by the measurement processing circuit 152*a* to the machine control system 112 can be limited. In general, for each sensor signal 104*s* received by the measurement processing circuit 152*a*, there can be a variety of possible process variables (e.g., determined values and/or measured variables of the enhanced data set). As an example, there can be 8 possible process variables determined by the measurement processing circuit 152*a* from a sensor signal 104*s* measuring radial vibration (vibration amplitude, gap voltage, 1× filtered amplitude, 2× filtered amplitude, 1× filtered phase, 2× filtered phase, Not 1× amplitude, and Smax. However, the measurement processing circuit 152a can possess the ability to output a single process variable for each sensor 104 from which it receives sensor signals 104s.

Figure 2A:
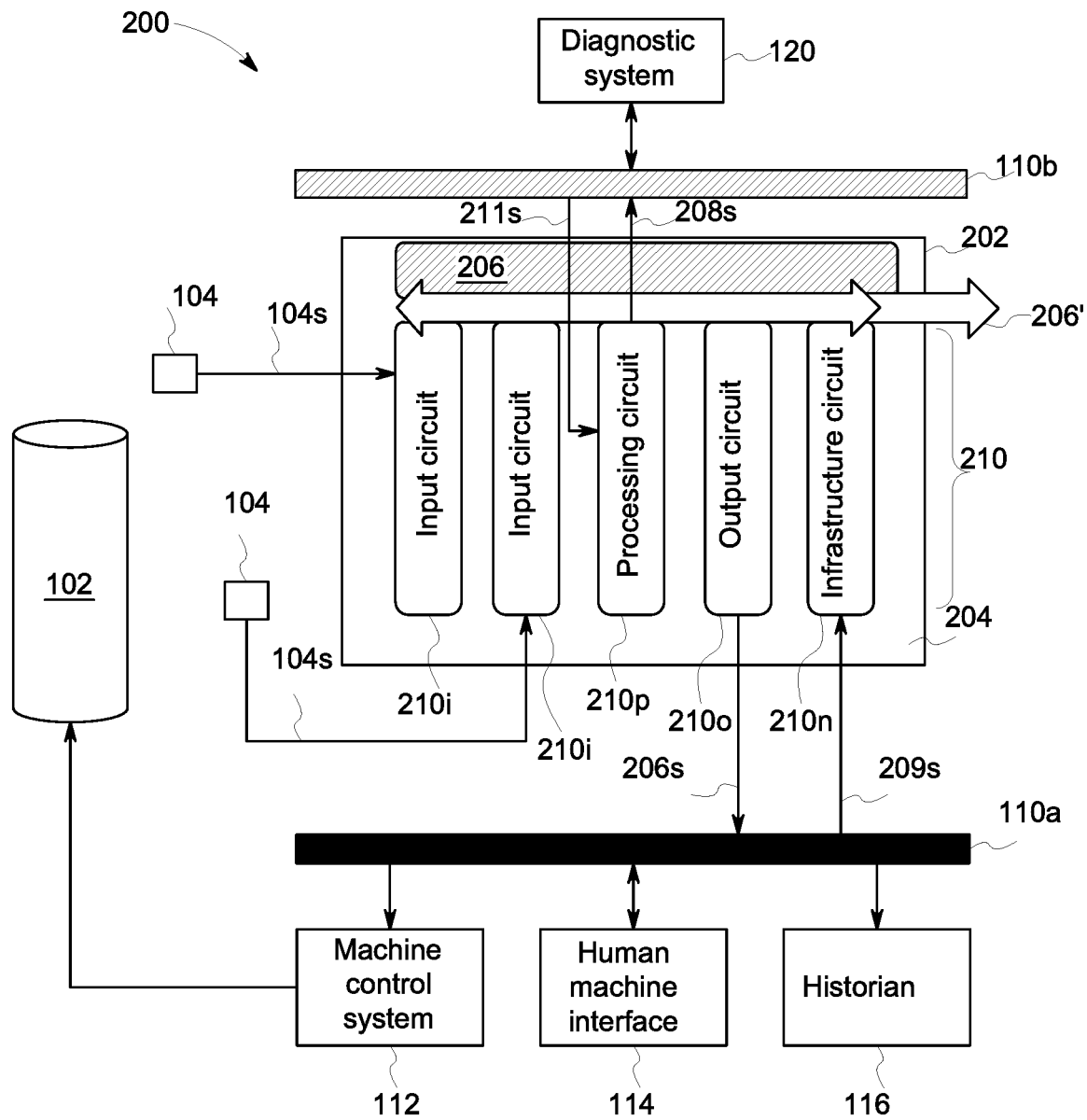
FIG. 2A is a diagram illustrating one exemplary embodiment of an operating environment containing a flexible monitoring system configured to monitor operating parameters of a machine.

One or more of these limitations can be addressed by embodiments of a flexible monitoring system of the present disclosure. FIG. 2A illustrates an exemplary embodiment of an operating environment 200 including a flexible monitoring system 202. The operating environment 200 can be similar to the operating environment 100, except that the monitoring system 106 is replaced with the flexible monitoring system 202. The flexible monitoring system 202 can include a base 204 containing a backplane 206, and one or more circuits 210. The backplane 206 can be configured to communicatively couple with two or more circuits 210 and receive data from at least one circuit 210 coupled thereto. As discussed herein, data transmitted to the backplane 206 can be referred to as monitoring data. In one aspect, monitoring data can include information contained within the sensor signals 104s, such as measured operating parameters of the target 102 and measured variables of the enhanced data set. Monitoring data can also include any values, statuses, and/or annunciated alarms that are determined based upon the measured operating parameters of the target 102 and/or measured variables of the enhanced data set. Circuits 210 coupled to the backplane 206 can retrieve monitoring data from the backplane 206. In certain embodiments, the backplane 206 can be passive. A passive backplane can contain substantially no or no logical circuitry that performs computing functions. Desired arbitration logic can be placed on daughter cards (e.g., one or more of the circuits 210) plugged into or otherwise communicatively coupled to the passive backplane.

In contrast to the circuits 152a, 154a, 156a, 160a of the monitoring system 106, the circuits 210 can be designed with a common architecture that is programmable to perform different predetermined functions of the flexible monitoring system 202. Sensor signals 104s received by one or more of the circuits 210 can be transmitted to the backplane 206 and monitoring data represented by the sensor signals 104s can be accessed by any circuit 210. Furthermore, the flexible monitoring system 202 can communicatively couple multiple bases in a manner that forms a common backplane 206' from the individual backplanes 206 of each base 204 (e.g., a logical backplane). Thus, circuits 210 can retrieve monitoring data from any backplane 206 forming the common backplane 206', rather than just from the backplane 206 to which they are physically coupled.

Figure 2B:
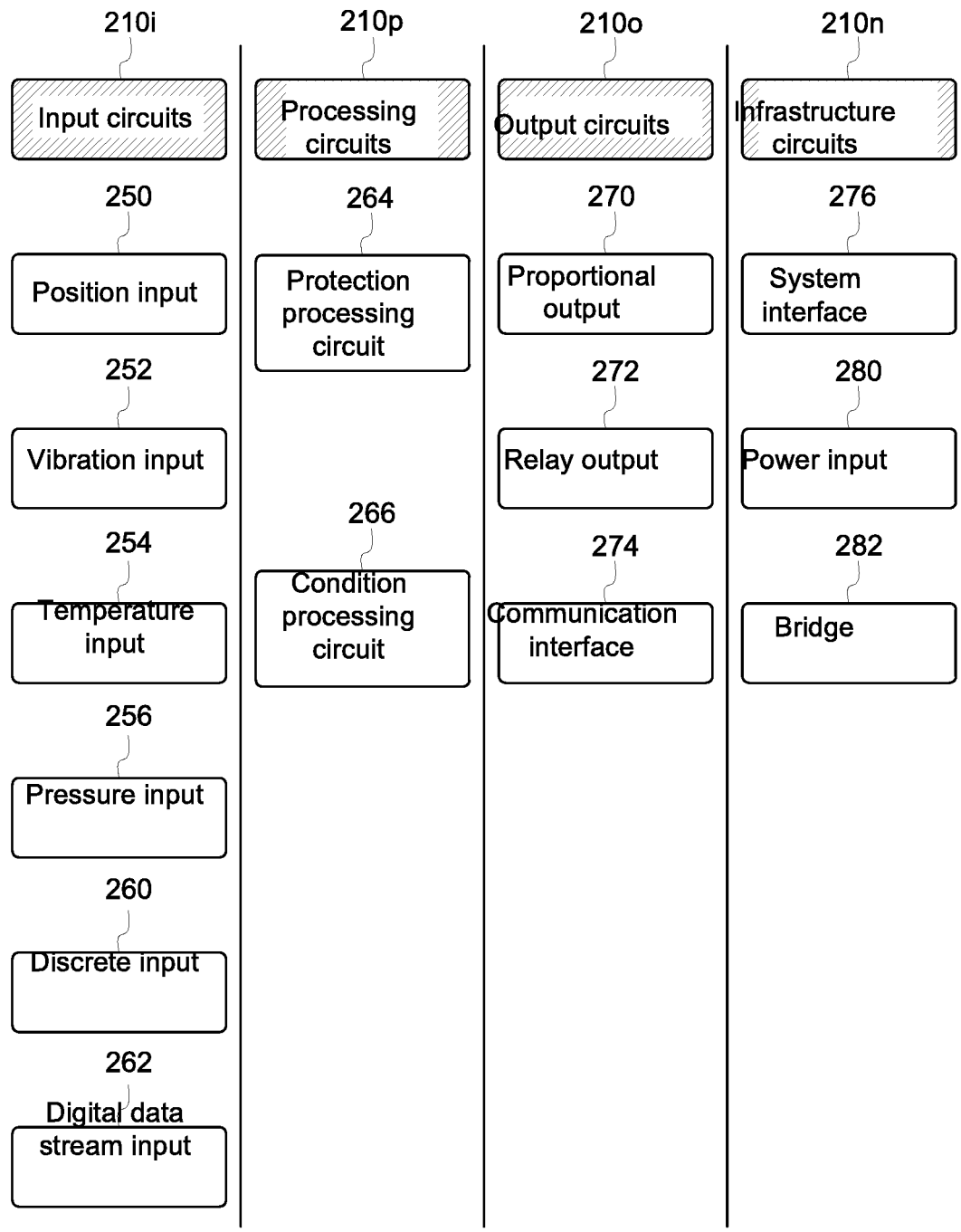
FIG. 2B is a diagram illustrating exemplary embodiments of circuits configured for use with the flexible monitoring system of FIG. 2A.
Figure 3:
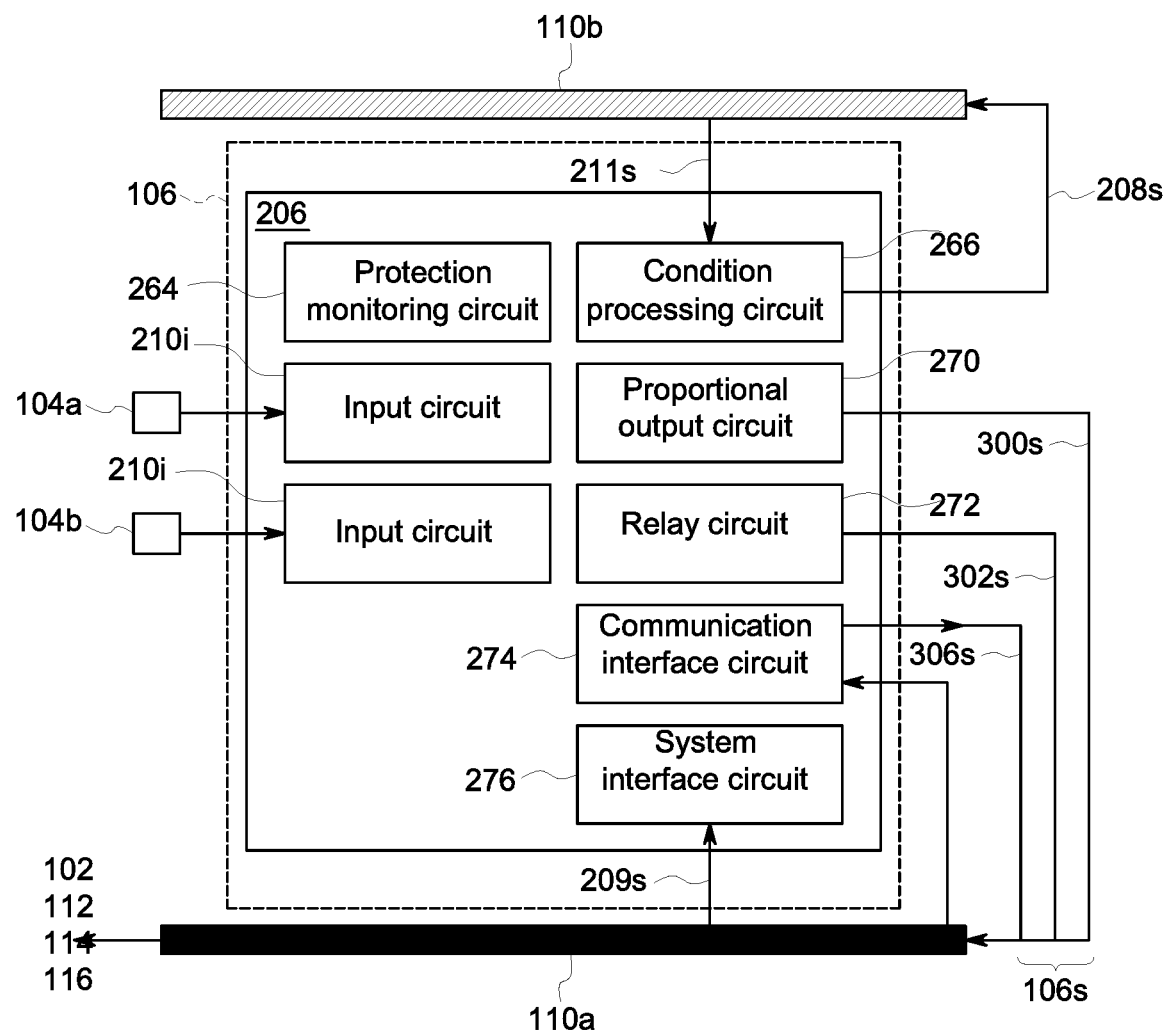
FIG. 3 is a diagram illustrating one exemplary embodiment of a backplane of the flexible monitoring system of FIG. 2A.

In certain embodiments, the circuits 210 of the flexible monitoring system 202 can be configured to provide at least functionality similar to that of circuits 152a, 154a, 156a, 160a of the monitoring system 106. Exemplary embodiments of circuits 210 are illustrated in FIGS. 2A-3 and discussed in detail below. As an example, circuits 210 can include input circuits 210i, processing circuits 210p, output circuits 210o, and infrastructure circuits 210n. It can be understood, however, that the circuits 210 can be programmed to perform other functions. Further discussion of the circuits 210 can also be found in U.S. patent application Ser. No. 15/947,716, entitled "Gated Asynchronous Multipoint Network Interface Monitoring System," the entirety of which is incorporated by reference. Accordingly, the flexible monitoring system 202 can be configured to receive sensor signals 104s and output monitoring signals 206s, 208s to the internal and external networks 110a, 110b, respectively. As discussed in detail below, embodiments of the flexible monitoring system 202 can receive command signals 209s, 211s from the internal and external networks 110a, 110b, respectively, without compromising security of the machine control system 112. As a result, the flexible monitoring system 202 can be a suitable replacement for existing deployments of monitoring systems 106 while providing improved flexibility and functionality.

With this architecture, the circuits 210 can be combined in various ways on one or more backplanes 206 to form different implementations of the flexible monitoring system 202. The number of bases 204, input circuits 210i, processing circuits 210p, output circuits 210o, and infrastructure circuits 210n included in a given implementation of the flexible monitoring system 202 can also be varied independently of one another. In some implementations, the flexible monitoring system 202 can be in the form of a single base 204 including circuits 210 configured to provide signal input, signal output, protection monitoring, condition monitoring, and combinations thereof. In other implementations, the flexible monitoring system 202 can be in the form of at least two bases 204 and circuits 210 configured to perform any combination of signal input, signal output, protection monitoring, and condition monitoring can be distributed between the at least two bases 204. In this manner, the input, processing, and output capabilities of the flexible monitoring system 202, as well as the physical location of different circuits 210 of the flexible monitoring system 202, can be tailored to specific monitoring applications.

Furthermore, implementations of the flexible monitoring system 202 can be modified after initially deployed to modify the circuits 210 coupled to a given base 204 in the event that the intended monitoring application changes. Given their common architecture, circuits 210 can be easily added to a base 204 having capacity to couple to a new circuit 210. Alternatively, one or more new bases 204 can be communicative coupled to an existing base 204, allowing one or more new circuits 210 to be couple to respective backplane(s) 206 of the new base(s) 204 and expanding the monitoring capabilities of the flexible monitoring system 202. In some instances, circuits 210 removed from one base 204 of the flexible monitoring system 202 can be stored in reserve as spares or redeployed to another base 204 of the same or a different implementations of the flexible monitoring system 202, which may be beneficial.

In certain embodiments, input circuits 210i can be configured to receive sensor signals 104s, perform signal conditioning on the sensor signals 104s, and output the conditioned sensor signals 104s to the backplane 206. In contrast to the monitoring system 106 of FIGS. 1A-1B, the input circuits 210i can be decoupled from processing circuits 210p, allowing the number of input circuits 210i of the flexible monitoring system 202 to be varied independently of the number of processing circuits 210p.

The sensor signals 104s can be received from a variety of different types of sensor 104. Examples of sensor types can include, but are not limited to, vibration sensors, temperature sensors (e.g., resistance temperature detectors or RTD), position sensors, and pressure sensors.

Embodiments of the flexible monitoring system 202 can include one or more input circuits 210i. As shown in the FIG. 2A, the flexible monitoring system 202 includes two input circuits 210i. Each of the input circuits 210i can be in communication with a respective sensor 104 for receipt of a corresponding sensor signal 104s. As an example, one sensor signal 104s can represent first monitoring data including measurements of a first operating parameter of a first machine component (e.g., acquired by a first sensor). The other sensor signal 104s can represent second monitoring data including measurements of a second operating parameter of a second machine component (e.g., acquired by a second sensor, different from the first sensor). In certain embodiments, the first and second machine components can be the same (e.g., the target 102). In other embodiments, the first and second machine components can be different (e.g., the target 102 and a different target [not shown]). Similarly, in some embodiments, the first and second operating parameters can be the same operating parameter. In one aspect, this configuration can provide redundancy in case of failure of one of the sensors 104. In another aspect, this configuration can be utilized where a desired measurement (e.g., shaft rotation speed) is derived from two sensor measurements coordinated in time (phase). In additional embodiments, the first and second operating parameters can be different. While two input circuits 210i have been illustrated and discussed, other embodiments of the monitoring system can include greater or fewer input circuits.

Different types of sensors 104 can generate sensor signals 104s in different formats, and input circuits 210i can be programmed to perform signal conditioning appropriate to the different sensor signals 104s before transmitting conditioned sensor signals to the backplane 206. As an example, a sensor signal 104s received from a position sensor can be received by a position input circuit 250. A sensor signal 104s received from a vibration sensor can be received by a vibration input circuit 252. A sensor signal 104s received from a temperature sensor can be received by a temperature input circuit 254. A sensor signal 104s received from a pressure sensor can be received by a pressure input circuit 256.

In other embodiments, the input circuit 210i can be in the form of a discrete contact circuit 260. The discrete contact circuit 260 can include a pair of contacts that can be closed by an external switch or relay. The pair of contacts can be closed by the machine control system 112 or by an operator of the machine control system 112 closing a switch. The discrete contact circuit 260 can be used to change the behavior of the flexible monitoring system 202. Examples of behavior changes can include, but are not limited to, a different mode of machine operation, causing the flexible monitoring system 202 to inhibit alarm determination, and resetting alarm states.

While the monitoring system 106 can include a discrete contact, it can lack specificity. As an example, changes effected by closing a discrete contact in the measurement system 106 can be effected upon all alarms generated by the measurement system 106. In contrast, because the discrete contact circuit 260 of the flexible monitoring system 202 can be separate from the protection processing circuit 264, the discrete contact circuit 260 can be configured to effect only selected alarm determinations and/or reset alarm states, or effect all alarms.

In further embodiments, the input circuit 210i can be in the form of a digital data stream input circuit 262. As an example, the digital data stream input circuit 262 can be configured to receive digital data streams from the sensor 104, the machine control system 112, and/or a trusted third-party system, as opposed to an analog data stream (e.g., from sensor 104).

Processing circuits 210p can be configured to retrieve any data from the backplane 206, analyze the retrieved operating parameters, and output the results of such analysis. In certain embodiments, the processing circuits 210p can be configured to perform protection functions and can be referred to as protection processing circuits 264 herein. In other embodiments, the processing circuits 210p can be configured to retrieve selected data from the backplane 206 and transmit the retrieved information to the diagnostic system 120 for performing diagnostic and/or predictive functions (e.g., condition monitoring) and can be referred to as condition processing circuits 266 herein.

The number of processing circuits 210p and input circuits 210i included in a given implementation of the flexible monitoring system 202 can be varied independently of the one another. In certain embodiments, processing circuits 210p can be added to the backplane 206 or removed from the backplane to tailor the amount of computing resources available for protection monitoring and/or condition monitoring. In other embodiments, a given processing circuit 210p can be replaced by another processing circuit 210p having greater or less computing power.

Any of these scenarios can be beneficial under certain circumstances, providing computational flexibility to the flexible monitoring system 202 that can be tailored to a given application and/or modified as needed. In one instance, machines having relatively low importance can have higher cost pressures and lower processing requirements. In this circumstance, an implementation of the flexible monitoring system 202 can include processing circuits 210p having processing resources tailored for cost. In another instance, a particular monitoring application can require high processing requirements (e.g., for determining values characterizing the measured parameters, for output of monitoring data, etc.). In this circumstance, an implementation of the flexible monitoring system 202 can include processing circuits 210p having processing resources tailored for processing resources. Thus, the architecture of the flexible monitoring system 202 can allow adaptation for different use cases depending upon the priorities of the intended monitoring application.

The protection processing circuits 264 and the condition processing circuits 266 are discussed below with reference to different functionalities. However, protection processing circuits 264 can be programmed to perform any function of the condition processing circuits 266. Condition processing circuits 266 can be programmed to perform functions of the protection processing circuits 264, except for transmitting data to the backplane 206 and providing local storage. The ability to inhibit the condition processing circuit 266 from transmitting data to the backplane 206 can inhibit unauthorized intrusion and facilitate protection of the internal network 110a and machine control system 112.

Protection processing circuits 264 can be configured to retrieve selected monitoring data from the backplane 206 in response to receipt of a protection command. As an example, one or more protection commands can be transmitted to protection processing circuits 264 in the form of protection command signal 209s received from the internal network 110a (e.g., from an operator of the machine control system 112). The selected monitoring data can include at least a portion of the monitoring data transmitted to the backplane 206. The monitoring data transmitted to the backplane can be received from an input circuit 210i or another protection processing circuit 264. The protection processing circuits 264 can also be configured to determine a value characterizing the selected monitoring data and transmit the determined value to the backplane 206 as additional monitoring data.

The protection processing circuit 264 can be configured to determine a status for the selected monitoring data based upon a comparison of the determined value, another determined value retrieved from the backplane 206 (e.g., from another protection processing circuit 264), and combinations thereof, with one or more predetermined set points. Predetermined set points can correspond to respective alarm conditions (e.g., an Alert condition, a Danger condition, etc.). Continuing the example above, where the determined value is an amplitude of a radial vibration, the one or more set points can include an Alert set point, a Danger set point that is greater than the Alert set point, and combinations thereof. In certain embodiments, a single set point can be employed. Assuming the use of Alert and Danger set points, if the radial vibration amplitude value is less than the Alert set point, the status of the radial vibration amplitude can be determined as "OK." If the radial vibration amplitude value is greater than or equal to the Alert set point, the status of the radial vibration amplitude can be determined as "Alert." If the radial vibration amplitude value is greater than the Danger set point, the status of the operating parameter can be determined as "Danger." After the status of the selected monitoring data is determined in this manner, the protection processing circuit 264 can transmit the determined status to the backplane 206. The condition processing circuit 266 can be configured to retrieve selected monitoring data from the backplane 206 and to provide the retrieved monitoring data to the external network 110b for use by diagnostic system 120. In certain embodiments, the selected monitoring data can be retrieved by the condition processing circuit 266 in response to receipt of a conditioning command. As an example, one or more conditioning commands can be transmitted to condition processing circuits 266 in the form of conditioning command signals 211s can be received from the external network 110b. (e.g., from an operator of the diagnostic system 120). In turn, the diagnostic system 120 can utilize the retrieved monitoring data to determine the cause of statuses and/or alarm conditions. Alternatively or additionally, the diagnostic system 120 can also employ the retrieved monitoring data to predict the development of statuses and/or alarm conditions before they arise. In further embodiments, the diagnostic system 120 can store the retrieved monitoring data for subsequent analysis. In additional embodiments, the diagnostic system 120 can transmit the retrieved monitoring data to another computing device for analysis.

In further embodiments, the condition processing circuit 266 can retrieve selected monitoring data from the backplane 206 based upon detection of a pre-determined status. As an example, the condition processing circuit 266 can retrieve and review statuses generated by the protection processing circuit 264 to identify a status matching the pre-determined status. The identified status can also include a status time characterizing the time when the status was determined. Upon identification of a match, the condition processing circuit 266 can retrieve selected monitoring data including operating parameter measurements corresponding to the pre-determined status for time durations before and/or after the status time. In this manner, the diagnostic system 120 can be provided with operating parameter information relevant to determining the cause of the status. The pre-determined statuses and selected monitoring data can be contained within the one or more conditioning commands.

The number of condition processing circuits 266 present in the flexible monitoring system 202 can be varied independently of the number of input circuits 210i. In certain embodiments, condition processing circuit 266 can be added to increase the ability of the flexible monitoring system 202 to output monitoring data. As an example, when two or more condition processing circuits 266 are present in the flexible monitoring system 202, each can tasked with output of different measured operating parameters. In another example, two or more condition processing circuits 266 can output the same measured operating parameters in order to provide redundancy. Each can be beneficial under certain circumstances, providing computational flexibility to the flexible monitoring system 202. In a further example, condition processing circuits 266 can be added to implement custom analytics without interfering with standard operation (e.g., when beta-testing a new analytic).

Output circuits 210o can be configured to obtain any monitoring data contained on the backplane 206 in response to receipt of output commands (e.g., contained in the one or more protection command signal 209s received from the internal network 110a). The output circuits 210o can further output the retrieved monitoring data to the internal network 110a in the form of monitoring signals 206s. Examples of monitoring data retrieved by output circuits 210o can include, but are not limited to, operating parameter measurements, the determined values, variables of the enhanced data set, statuses, and alarms.

In one aspect, output circuits 210o can be in the form of proportional output circuits 270. The proportional output circuits 270 can be configured to output monitoring signals 206s in the form of process control signals 300s. The process control signals 300s can be proportional to process variables, such as direct measurement values or variables of the enhanced data set, as compared to a predetermined scale. As an example, a current output can be a 4-20 mA output. The process control signals 300s can be provided to the machine control system 112, either directly or via the internal network 110a, to facilitate control of operating parameters of the target 102. The process variables included in the process control signals 300 can be specified by the protection command signal 209s.

In further embodiments, output circuits 210o can be in the form of one or more relay circuits 272 configured to retrieve selected status data from the backplane 206 and to actuate based upon received alarm statuses to annunciate an alarm. Annunciated alarms can be output in the form of alarm signals 302s. In one example, relays can actuate based upon a single status. In another example, relays can actuate based upon predetermined Boolean expressions (e.g., AND or OR voting) that combine two or more statuses. The alarm signals 302s can be provided to the machine control system 112 via the internal network 110a, or directly to the machine control system 112, to facilitate control of operating parameters of the target 102. As an example, the machine control system 112 can shut down operation of the target 102 in response to receipt of an alarm signal 302s. The selected status data and the logic employed for actuation of a relay can be specified by the protection command signal 209s In other embodiments, output circuits 210o can be in the form of at least one communication interface circuits 274. The communication interface circuit 274 can be configured to retrieve selected monitoring data from the backplane 206 in response to receipt of the protection command signal 209s. The selected monitoring data can include one or more of the measured operating parameters, the measured variables of the enhanced data set, determined statuses, and determined alarms. The retrieved data can be transmitted to the internal network 110a in one or more return signals 306s for use by machine control system 212 (e.g., for process control), the HMI 114 (e.g., display to an operator) and/or stored by the historian 116.

Infrastructure circuits 210n can be configured to perform functionality required for the flexible monitoring system 202 to operate. In one aspect, infrastructure circuits 210n can take the form of a system interface circuit 276. The system interface circuit 276 can function as an access point for transmission of protection command signals 209s from the internal network 110a to the monitoring system 220, facilitating configuration of the circuits involved in protection monitoring (e.g., protection processing circuit 264, output circuits 210i). The protection command signals 209s can include one or more signals including any of the following in any combination: identification of selected monitoring data for each of the protection processing circuit 264 and output circuits 210i to retrieve and/or output, alarm set points for the protection processing circuit 264, and logic for annunciation of relays by relay output circuits 272.

It can be appreciated that, in contrast to the monitoring system 106, embodiments of the flexible monitoring system 202 can separate the circuits 210 that configure protection monitoring functions (e.g., the system interface circuit 276) and condition monitoring functionality (e.g., the condition processing circuit 266). As a result, protection monitoring configuration can be performed entirely on the internal network 110a while condition monitoring configuration can be performed entirely on the external network 110b. That is, the internal network 110a is not communicatively coupled to the external network 110b. As a result, conditioning command signals 211s can be provided to the condition processing circuit 266 without the need to obtain approval from an authorized operator of the machine control system 112.

In appreciation of cybersecurity risks inherent in allowing the condition processing circuit 266 to communicate with the external network 110b and the backplane 206, the condition processing circuit 266 can be limited to unidirectional communication with the backplane 206 for data retrieval only. Such unidirectional communication can be established by any combination of hardware (e.g., data diodes), firmware, and/or software. In certain embodiments, this unidirectional communication is provided at least through hardware. As a result, the flexible monitoring system 202 can be kept secure from malicious actors while facilitating rapid configuration of the condition processing circuit 266.

In another aspect, infrastructure circuits 210n can take the form of power input circuits 280. Power input circuits 280 can provide the ability to connect one or more power sources to the flexible monitoring system 202.

In a further aspect, infrastructure circuits 210n can take the form of bridge circuits 282. The bridge circuits 282 can provide the ability to connect the backplanes 206 of two or more bases 204 together and to form the common backplane 206' for communication therebetween.

So configured, embodiments of the circuits 210 can be arranged in any combination distributed amongst one or more bases 204 to form implementations of the flexible monitoring system having desired monitoring capabilities (e.g., input, processing, output, etc.). Exemplary embodiments of flexible monitoring systems 202 constructed from different groupings of circuits 210 and bases 204 to provide different monitoring functions are illustrated below.

Figure 4:
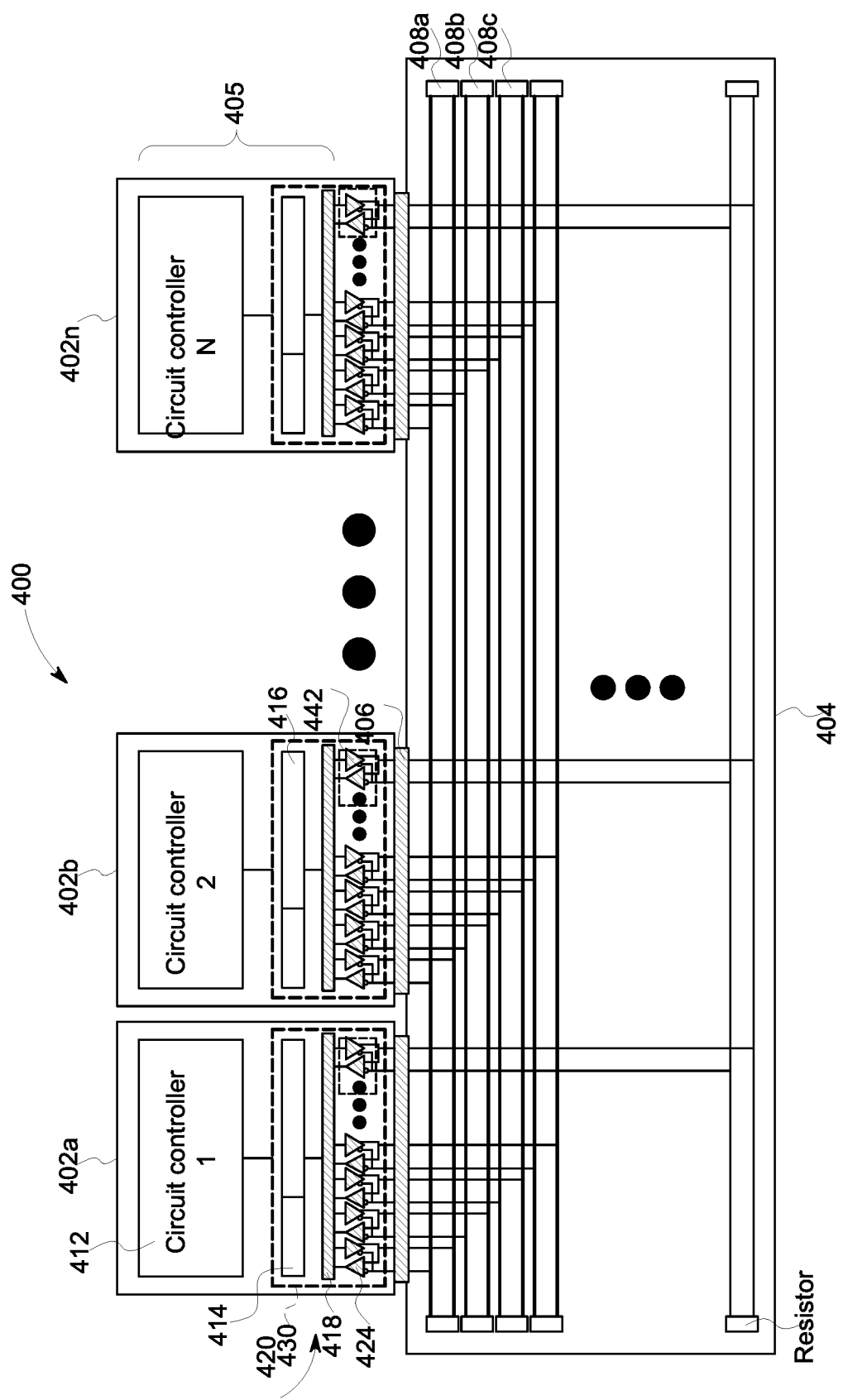
FIG. 4 is a schematic illustration of an exemplary monitoring system.

FIG. 4 is a schematic illustration of an exemplary monitoring system 400. The monitoring system 400 can include a plurality of monitoring circuits 402a-n that can be detachably coupled to a backplane 404 via ports (e.g., port 406) of the backplane 404. The backplane 404 can be, include, or form part of, a physical bus. The backplane can be a passive backplane configured to facilitate multipoint asynchronous electronic communication between the monitoring circuits 402a-n that are coupled to the backplane 404. Therefore, data packets delivered to the backplane can be received by one or more monitoring circuits coupled to the backplane. In FIG. 4, the backplane can include a number of data lanes 408a-c that are in electronic communication with a number of ports (e.g., port 406) that are configured to receive monitoring circuits. Each port can be configured to facilitate electronic communication between a monitoring circuit (e.g., monitoring circuit 402b) coupled to the port (e.g., port 406), and one or more data lanes (e.g., 408a-c) of the backplane 404.

Various types of monitoring circuits can be coupled to the backplane. For example, as described above, a monitoring circuit can be an input circuit, a processing circuit, a communication gateway circuit, a SIM circuit, a relay circuit, a condition monitoring (CM) circuit and the like. Some monitoring circuits (e.g., processing circuits) can be configured to both broadcast data packets on the data lanes of the bus and read/receive data packets from the data lanes of the bus. Other monitoring circuits (e.g., condition monitoring circuits) can be configured to only read/receive data packets from the data lanes of the bus. In some embodiments, each monitoring circuit can have a unique ID that can be used to identify the monitoring circuit. Data packets broadcasted by a monitoring circuit can include the unique ID associated with the monitoring circuit.

A monitoring circuit can include a circuit controller unit 405 that can control the operation of the monitoring circuit. The circuit controller unit 405 can include a circuit controller 412, a schedule controller 414, a node controller 416 and a gate controller 418. The monitoring circuit can include a gate (or multiple gates) 420 that can broadcast data packets to the data lanes of the back plane (e.g., data packets from the circuit controller 412, node controller 416, etc.) and/or transfer data packets from the data lanes of the back plane to the circuit controller 412. In some implementations, the gates 420 can transfer data packets to an external condition monitoring system, a portable monitoring system and the like. In some embodiments, the node controller, gate controller, and/or gates can be a field programmable gate array (FPGA).

In some implementations, the schedule controller 414, the node controller, the gate controller 418 and the gates 420 can form a node 430 of the monitoring circuit 402a. The node can act a liaison between the circuit controller 412 and the data lanes of the back plane 404. The node 430 can facilitate and control electronic communication between the circuit controller 412 and the back plane 404. For example, the node 430 can control delivery of data packets from the circuit controller 412 to the data lanes of the backplane 404. The node can also control the transfer of data packets from the data lanes to the circuit controller of the monitoring circuit. For example, the node 430 can be configured to transfer data packets from the data lane to the circuit controller (or an external condition monitoring system) based on a predetermined schedule of the monitoring system.

The circuit controller 412 can include a memory, at least one data processor, and/or other circuitry configured facilitate operation as described herein. The circuit controller 412 can be configured to perform specific operations corresponding to desired functionality of the monitoring circuit. In some embodiments, the circuit controller 412 can be configured to receive data from an external source (e.g., a sensor, or a user device, a data acquisition system, a condition monitoring system, etc.), process the data, and provide the data to the node 430. For example, the circuit controller 412 can include an analog-to-digital (A/D) converter that can be configured to receive analog signals from sensors (e.g., sensors configured to detect operating parameters of industrial machines) and convert the analog signals to digital signals. The circuit controller 412 can be configured to receive data from one or more data lanes of the backplane (e.g., via the node), process the data, and provide the data to an external source (e.g., a user device, a data acquisition system, a condition monitoring system, etc.). The circuit controller 412 can also be configured to provide control signals to the node controller 416 and/or gate controller 414 to instruct delivery of data packets to/received data packets from the data lanes of the backplane 404.

Node controller 416 can be in electronic communication with the circuit controller 412 and gate controller 418 of the corresponding monitoring circuit. The node controller 416 can include memory 413, at least one data processor, and/or other circuitry configured facilitate operation as described herein. The node controller 416 can function as an interface between the circuit controller 412 and the gate controller 418 and/or the gates. For example, the node controller 416 can be configured to control which data is delivered to the circuit controller 412 using, e.g., packet filtering techniques. As an example, a circuit controller 412 of a monitoring circuit (e.g., a processing circuit, input circuit, output circuit, condition monitoring circuit, and the like) can send a signal to the node controller 416 to request specific data from the backplane 404. The node controller 416 can monitor data lanes of the backplane, identify the desired data packets, and deliver the data packets to the circuit controller for processing. This can be done, for example, by the gate controller 418 which can send a control signal to the gate 420 which can instruct the gate 420 to transfer data packets from the backplane 404 to the node controller 416. The node controller can, in turn, transfer the data in the transferred data packets to the card controller 412.

In some embodiments, the node controller 416 can use information provided with data packets delivered to the backplane (e.g., by various monitoring circuits 402*a-n* coupled to the backplane) to identify relevant data to provide to the circuit controller 412. For example, the node controller 416 can use IP addresses, MAC addresses, TCP/IP headers, UDP/IP headers, message headers, object headers, source information, destination information, and/or contents of the data packets to identify relevant data packets to provide to the circuit controller. In some implementations, gates 420 can transfer multiple data packets from the backplane 404 to the circuit controller 412/node controller 416, and the circuit controller 412/node controller can filter out specific data packets (e.g., based on request from a conditional monitoring system). The filtering can be based on unique identifier in the data packets (e.g., representative of the operating parameters contained in the data packets).

In some embodiments, the node controller can be configured to receive signals from the circuit controller, encode the signals into bits, and deliver signals corresponding to the encoded bits to the gate controller (e.g., in the form of data packets) for the data to be delivered to data lanes of the backplane. The node controller can also store a copy of a system frame schedule that can be used to control operation of the gates.

The gate controller 418 can include memory, at least one data processor, and/or other circuitry configured facilitate operation as described herein. Each gate controller can be in electronic communication with the gates 420 and the node controller 416 of the corresponding monitoring circuit. Each gate controller can be configured to control operation of the gates of the corresponding monitoring circuit, thereby controlling data flow between the monitoring circuit and the data lanes of the backplane. For example, gate controller 418 can control operating modes of the gate 420 (which can include a receiver 424 and a transmitter 422). In some embodiments, the gate controllers can be configured to control operating modes of the gates based on a predetermined schedule and/or instruction provided by the node controller. As an example, the gate controllers can be configured to receive data from the node controller, store the data, and deliver the data (e.g., in the form of data packets) to the data lanes at a scheduled time. In some embodiments, the gate controller can receive the schedule from the node controller. In some embodiments, each data lane can have a corresponding schedule that defines when the various monitoring circuits can deliver signals to that particular data lane.

The gate 420 can include a transmitter 422 that can broadcast data packets to a data lane in the back plane 404. The gate 420 can also include a receiver 424 that can read/transfer data packets from a data lane in the back plane 404 to the node controller 416. In some embodiments, the receiver 424 can be configured to modify and/or control signals delivered to the node controller 416 from the backplane 404. For example, the receiver 424 can receive signals from the data lanes of the backplane, amplify the signals, and provide the signals to the circuit controller 412 (e.g., via the gate controller and/or the node controller).

In some embodiments, the receiver 424 can have a first and a second operating modes. In the first operating mode, the receivers can be configured to allow data packets to be transferred from the data lane (e.g., data lanes 408*a-c*) to the node controller 416. In the second operating mode, the receivers can be configured to prevent data packets from the data lane (e.g., data lanes 408*a-c*) to the node controller 416.

The schedule controller 414 can generate a schedule that can determines when each monitoring circuit can deliver data to each data lane of the backplane. The schedule can be distributed among the monitoring circuits (e.g., monitoring circuits 402*a-n*) via the data lanes (e.g., data lanes 408*a-c*) of the backplane 404. For example, schedule controller 414 in the monitoring circuit 402*a* can prepare the schedule which can be distributed to the monitoring circuits 402*b*-402*n* via one or more data lanes 408*a-c*.

Controlling operating modes of the gates 420 can be referred to as gating. Each schedule can include a time frame (also referred to as "system frame") that can correspond to a predetermined amount of time associated with transfer of data packets between monitoring circuits. The frame can be divided into a number of time slices. The schedule can assign/allocate a time slice to a monitoring circuit. Schedule generation can also be referred to as arbitration. Monitoring circuits that are capable of generating schedules (e.g., monitoring circuits that include a schedule controller 414) and delivering the schedules to the data lanes can be referred to as arbitration capable monitoring circuits (or master monitoring circuits). The generated schedules can be broadcasted to the data lanes in a beacon packet which can be received by the monitoring circuits of the monitoring system. The beacon packet can include a reference time. The time slices in the schedule can be temporally arranged relative to the beacon packet. Additionally, the reference time can be indicative of an internal clock of the master monitoring circuit.

Figure 5:
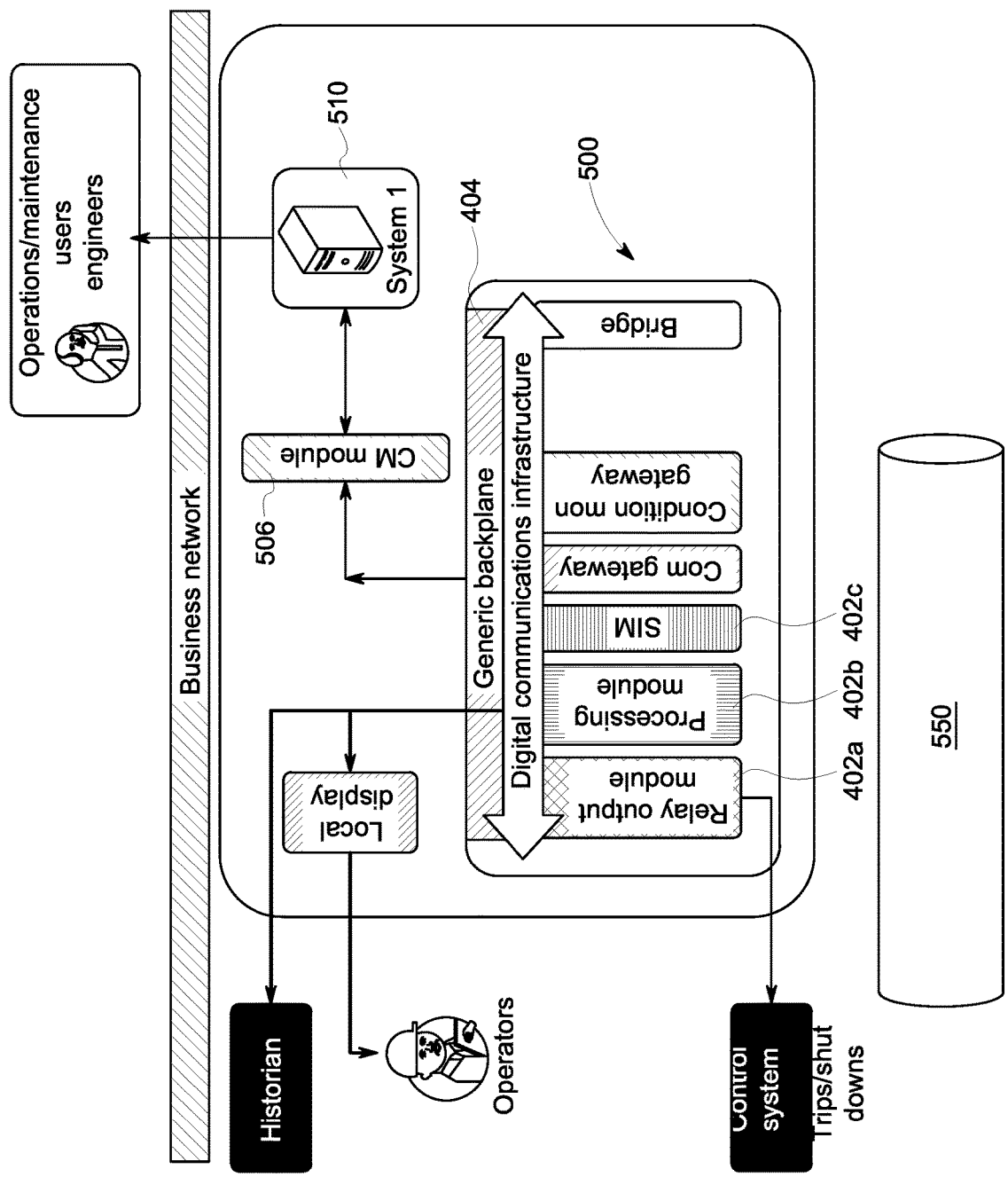
FIG. 5 is an illustration of an exemplary monitoring system that can monitor the operation of an industrial machine.

FIG. 5 illustrates an exemplary monitoring system 500 that can monitor the operation of an industrial machine 550. The monitoring system 500 can include multiple monitoring circuits 402*a-n*. The monitoring circuits can be configured to operate as an input circuit (e.g., input circuit 210*i*), a relay output circuit (e.g., output circuit 210*o*), processing circuit (e.g., processing circuit 266), SIM circuit, and the like. The monitoring system 500 can also include a condition monitoring circuit 506 that can transfer data broadcasted on the back plane 404 to a data collection software and/or a condition monitoring software which can operate, for example, on a condition monitoring system 510, a server, and the like. The monitoring circuits 402a-n and condition monitoring circuit 506 can be detachably coupled to the back plane 404. The condition monitoring system 510 can communicate with the condition monitoring circuit 506 (e.g., request data broadcasted on the back plane 404). Additionally or alternately, the condition monitoring circuit 506 can transfer data (e.g., data requested by the condition monitoring system 510) to the condition monitoring system 510.

The condition monitoring circuit 506 can support an operating system. The operating system can communicate with the operating system on the condition monitoring system 510. In one implementation, the condition monitoring circuit 506 can perform condition monitoring operations on the machine 550. For example, the condition monitoring circuit 506, can execute a portion of the condition monitoring software in the condition monitoring system 510. The condition monitoring circuit 506 can generate an alarm and notify an authorized operator if operating parameters of the machine 550 exceeds a threshold value. The condition monitoring circuit 506 can be configured to transfer data packets from data lanes in the back plane 404 to the condition monitoring system 510. The condition monitoring circuit 506 can also be configured to prevent transfer of a data packet to the monitoring system 500 from the condition monitoring system 510.

Figure 6:
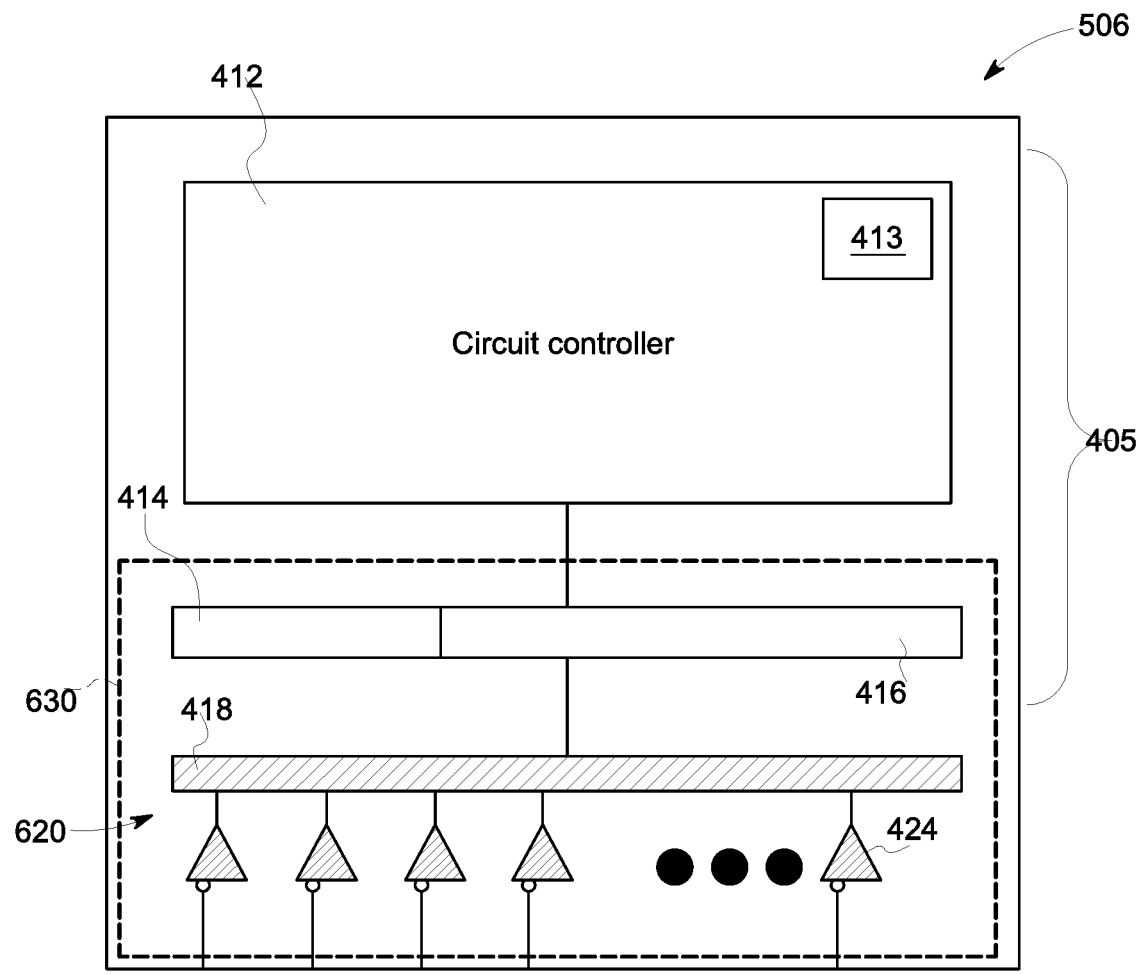
FIG. 6 is a schematic illustration of an exemplary condition monitoring circuit.

FIG. 6 is a schematic illustration of an exemplary condition monitoring circuit 506. As described before, the condition-monitoring circuit 506 can include a circuit controller unit 405 that can include a circuit controller 412, a schedule controller 414, a node controller 416 and a gate controller 418. The condition monitoring circuit can include one or more gates 620 that can include one or more receivers 424. However, the gates 620 may not include a transmitter. Therefore, the condition monitoring circuit can allow for a unidirectional flow of data packets where data packets can only be read/transmitted data from the back plane 404 to the components of the monitoring card (e.g., card controller 412, node controller 416, gate controller 418, etc.), but cannot broadcast data packets to the data lanes of the back plane. For example, the transmitter 424 can transmit data packets broadcasted on the back plane 404 to the node controller 416. This can be done, for example, by transmission of data on the data packets broadcasted on the back plane 404 directly to the node controller 416 or to the node controller 416 via the gate controller 418. The gate controller 418 can send a control signal to the transmitter 424 based on which the transmitter 424 can transfer data packets from the backplane 404 to the node controller 416. The node controller 416 can transmit data in the transferred data packets to the circuit controller 412.

Figure 7:
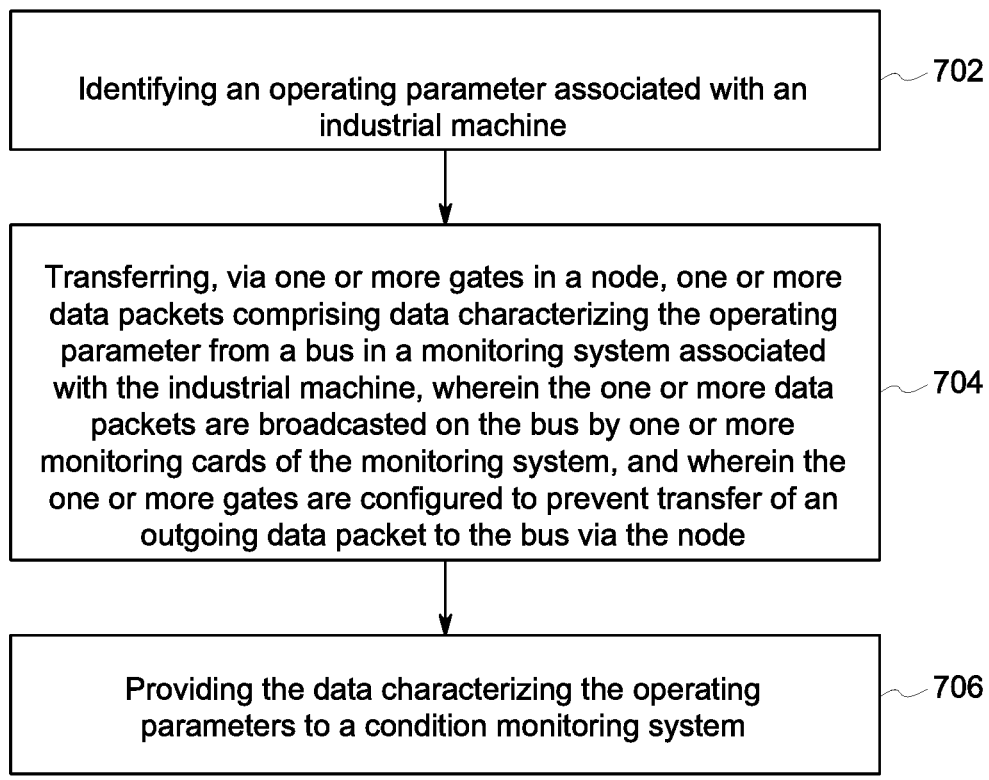
FIG. 7 is a process flow diagram illustrating an exemplary method of transferring data packets from a monitoring system to the condition monitoring system.

FIG. 7 is a process flow diagram illustrating an exemplary method of transferring data packets from the monitoring system 500 to the condition monitoring system 510. At 702, an operating parameter associated with the industrial machine 550 can be identified (e.g., by the circuit controller 412 of the condition monitoring circuit 506). The identification of the operating parameter can be based on a request from the condition monitoring system 510. For example, the condition monitoring system can send a request signal to the condition monitoring circuit 506 (e.g., circuit controller 412 of the condition monitoring circuit 506) that identifies the operating parameter (e.g., position, vibration, temperature, speed, etc. associated with machine 550). Alternately, the circuit controller 412 may identify the operating parameter (e.g., based on a condition monitoring operation executed by the circuit controller 412). The monitoring system 500 can detect operating parameters of the machine 550 (e.g., operating parameters identified by the condition monitoring system 510) via one or more sensors and broadcast the detected data on the back plane 404. For example, the identified operating parameter can be broadcasted on one or more data lanes of the backplane 404 by an input circuit (not shown) that receives the identified operating parameter from a sensor associated with machine 550.

At 704, one or more data packets that include data characterizing the identified operating parameter (e.g., identified at step 702) can be transferred from the backplane 404 of the monitoring system 500. This can be done, for example, by configuring one or more gates 620 (e.g., receivers 424 in a gate 620) in the node 630 to transfer data packets that are being broadcasted in the data lanes of the bus 404. These data packets can be transmitted to the node controller 416 and/or the circuit controller 412. The node controller 416 and/or the gate controller 418 can control the operation of the gates 620 (e.g., set the gates 620 to the first operating mode in which receivers 424 in the gates 620 are configured to transfer data packets broadcasted on the data lanes of the bus 404 to the node controller 416/circuit controller 412). In some implementations, gates 620 can transfer the data packets directly to the condition monitoring system 510 obviating the circuit controller 412.

In some implementations, the circuit controller 412 can receive a beacon packet from the backplane 404. The beacon packet can include a system frame schedule of the monitoring system 510. The system frame schedule can be indicative of time slices during which one or more data packets are scheduled to be broadcasted on the back plane 404. The data packets can include data characterizing the identified operating parameter (e.g., operating parameter identified at 702). The beacon packet can also include a reference time associated with the monitoring system 510. The circuit controller 412 can synchronize the internal time of the circuit controller 412 with the reference time in the beacon packet. This can allow the circuit controller 412 to determine the occurrence times of the time slices associated with the system frame schedule with precision (e.g., precision of tens of nanoseconds). This can allow the circuit controller 412 to configure the gates 620 (e.g., via gate controller 418) to operate in the first operating mode during the occurrences of selected time slices of the system frame schedule. As a result, data packets broadcasted on the back plane 404 during the selected time slices to be transferred to the circuit controller 412. For example, the selected time slices can correspond to the time when data packets associated with the identified operating parameters are broadcasted on the back plane 404. Selection of time slices can be based on the schedule in the beacon packet.

In another implementation, the gate controller 418 can configure the gates 620 to transfer data packets from the backplane 404 to the circuit controller 412 during the entirety (or during multiple time slices) of the system frame schedule. The transferred data packets can be transmitted to the circuit controller 412 which can then select the one or more data packets that include data characterizing the identified operating parameters. The data packets associated with the identified operating parameters can be selected (e.g., by node controller 416 and/or circuit controller 412) based on unique identifiers in the transferred data packets. The unique identifiers can be indicative of the operating parameter included in the corresponding data packet.

At 706, the data characterizing the operating parameters can be provided to the condition monitoring system 510. The circuit controller 412 can transmit the data in the data packets selected at 704 directly or indirectly to the condition monitoring system 510. In some implementations, the circuit controller 412 can aggregate the data in the various selected data packets (e.g., data packets selected at 704) into one data packet and transmit the aggregated data packet. In some implementations, the circuit controller 412 can store the data in the data packets selected at 704 in a local memory 413 or on a cloud. The circuit controller 412 may also provide the selected data packets to a user (e.g., display the data). In some implementations, the circuit controller 412 can determine an operational status (e.g., health of the machine, alarms associated with the machine, and the like) based on the selected data packets. Additionally or alternately, the circuit controller 412 can perform condition monitoring operation of the machine 550. Condition monitoring operation can include calculation/determination of one or more condition monitoring parameters such as configuration of sensors (e.g., sensors configured to detect operating parameters of machine 550), location and operating parameters of the machine 550, operating states of the machine 550, and the like.

Figure 8:
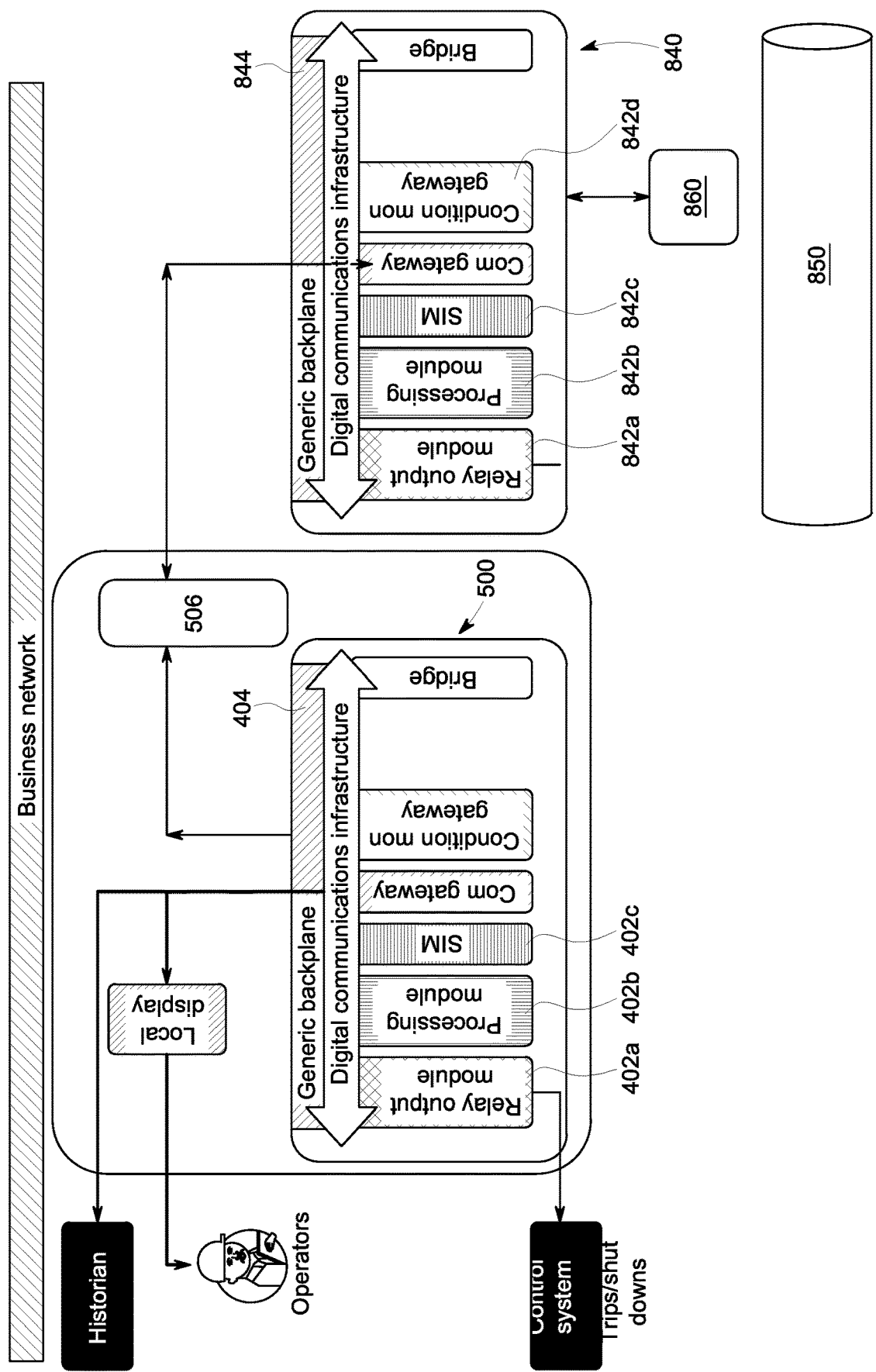
FIG. 8 is a schematic illustration of an exemplary unidirectional coupling between a monitoring system and a portable monitoring system via a condition monitoring circuit.

FIG. 8 is a schematic illustration of an exemplary unidirectional coupling between the monitoring system 500 and a portable monitoring system 840 via the condition monitoring circuit 506. As described before, the monitoring system 500 can include multiple monitoring circuits 402*a-n* detachably coupled to the back plane 404. The monitoring system 500 can monitor the operations of the machine 850 (e.g., via multiple machine sensors [not shown] configured to detect one or more operating parameters of the machine 850 and transmit the measurement data to the back plane 404 via an input circuit).

A portable monitoring system 840 can communicate with the condition monitoring circuit 506 (e.g., request data broadcasted on the back plane 404). The portable monitoring system 840 can include a secondary bus 844 to which multiple monitoring circuits 842*a-d* can be coupled (e.g., detachably coupled). The portable monitoring system 840 can be coupled to a sensor 860 configured to detect one or more operating parameter associated with the machine 850. For example, the sensor 860 can detect an operating parameter of the machine 850 that may not be directly available to the monitoring system 500 (e.g., monitoring system may not have a sensor that can detect the operational parameter detected by sensor 860). Additionally or alternately, sensor 860 can detect operating parameters at a higher temporal and/or spatial resolution than the sensors associated with the monitoring system 500. For example, sensor 860 can include multiple sub-sensors that can be coupled to the machine 850 that can detect multiple operating parameters of a given region of the machine 850 (e.g., a region of a machine behaving in an undesired manner).

Figure 9:
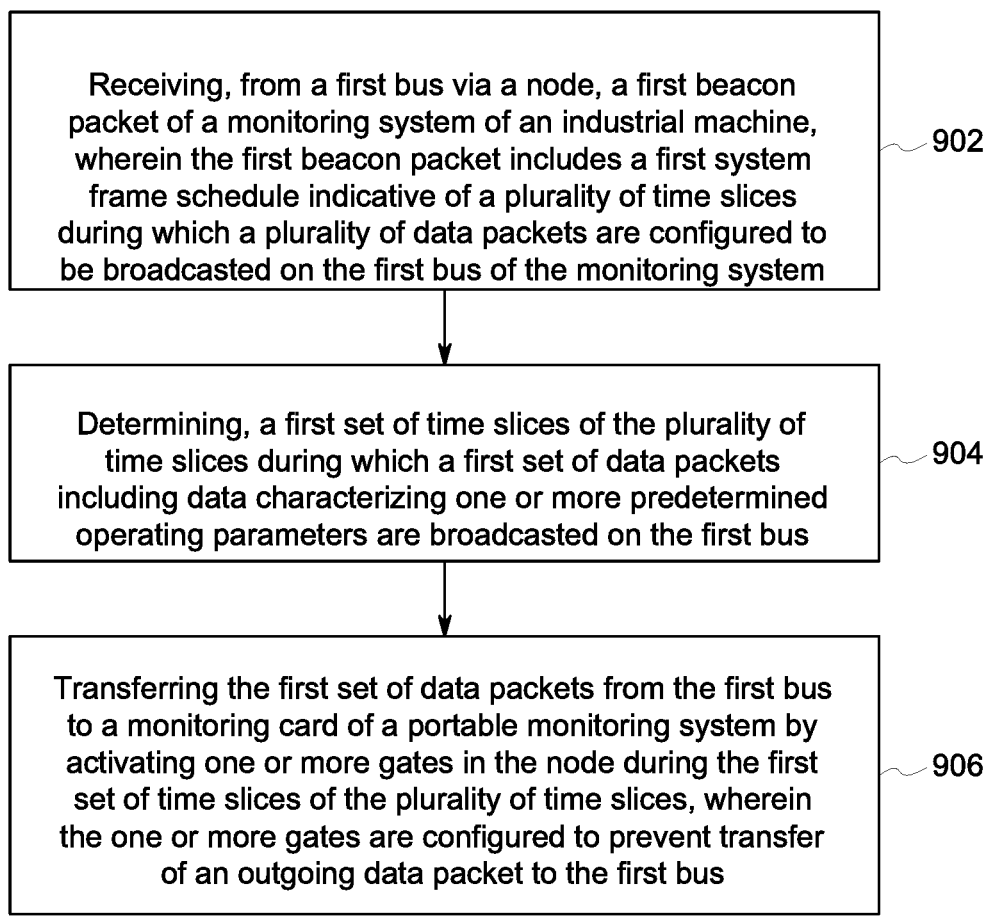
FIG. 9 is a process flow diagram illustrating an exemplary method of monitoring an industrial machine by a portable monitoring system.

FIG. 9 is a process flow diagram illustrating an exemplary method of monitoring an industrial machine by a portable monitoring system. At 902, a beacon packet associated with the monitoring system 500 is received from the bus 404. The beacon packet can be received by the portable monitoring system 840. For example, the beacon packet can be detected by receiver 424 in the gate 620 of the condition monitoring circuit 506. The beacon packet can be transmitted to the portable monitoring system 840 (e.g., by the circuit controller 412 of the monitoring circuit 506). An input monitoring circuit 842*d* of the portable monitoring system 840 can receive the beacon packet transmitted by the condition monitoring circuit 506. The beacon packet can be stored in a memory of the input monitoring circuit 824*d*. The beacon packet can include a first system frame schedule indicative of a plurality of time slices during which a plurality of data packets are configured to be broadcasted on the bus 404. The beacon packet can also include a reference time indicative of an internal time of the monitoring system 500. The portable monitoring system can set its internal clock based on the reference time of the monitoring system 500. The beacon packet can be broadcasted on the bus 404 by a monitoring circuit (e.g., one of the monitoring circuits 402*a-c* designated as the master monitoring circuit) detachably coupled to the bus 404.

At 904, a first set of time slices of the plurality of time slices are determined. During the first set of time slices a first set of data packets including data characterizing one or more predetermined operating parameters are broadcasted on the back plane 404 (e.g., by one or more of the monitoring circuits 402*a-c*). The predetermined operating parameters can be a set of operating parameters that may be needed by the portable monitoring system 840 to provide condition and/or protection monitoring to the machine 850. For example, the portable monitoring system 840 can determine that it requires an operational parameter ((e.g., position, vibration, temperature, speed, etc.) associated with the machine 850 which is available to the monitoring system 500 (e.g., monitoring system 500 can be coupled to sensors that that can detect the required operating parameters from the machine 850). In some implementations, the portable monitoring system 840 (e.g.. a processor circuit in the portable monitoring system) can determine the first set of time slices based on the schedule in the beacon packet. The schedule can indicate the time slices during which data packets containing the one or more operating parameters of the machine 850 are broadcasted on the back plane 404. In some implementations, the system frame schedule in the beacon packet can indicate the time slices corresponding to unique identification (e.g. mac address) of the input monitoring circuit configured to broadcast during the time slices. The portable monitoring system 840 may know the input monitoring circuits (and their unique identification) that will broadcast the predetermined operating parameters on the back plane 404. Based on this information, the portable monitoring system 840 can determine the first set of time slices in the system frame schedule.

Data packets broadcasted on the back plane 404 can include a unique identifier that can be indicative of its content. For example, the unique identifier can indicate the operating parameter data contained in the data packet. In some implementations, multiple data packets broadcasted on the data plane 404 can be transmitted to the portable monitoring system 840. A monitoring card in the portable system 840 can receive the data packets and determine the first set of data packets that include the unique identifier associated with the predetermined data parameter.

At 906, the first set of data packets are transferred from the bus 404 to a monitoring circuit of the portable monitoring system 840. This can be done, for example, by activating one or more gates 620 in the node 630 of the condition monitoring circuit 506. In one implementation, the portable monitoring system 840 can send a node activity schedule to the circuit controller 412. The node activity schedule can include the time durations during which the gate 620 needs to be activated. Based on the node activity schedule, the gate controller 418 can activate the receivers 424 in the gate 620. For example, the gate 620 can be activated during the time slices determined at 904 (e.g., time slices during which data packets that include predetermined operating parameters are broadcasted) that are included in the node schedule. The data packets transferred from the back plane 404 to the portable monitoring system 840 can include unique identifiers can be indicative of the predetermined operating parameter included in the corresponding data packet.

The portable monitoring system 840 can receive the data packets from the backplane 404. Additionally or alternately, the portable monitoring system 840 can be further configured to receive data characterizing sensor measurement from one or more sensors (e.g., sensor 860) coupled to the industrial machine 850. The data characterizing sensor measurement can include an operational parameter value detected by the sensor 860. The data characterizing sensor measurement can also include the time associated with the detected operational parameter. Time measurement of the detected operational parameter can allow the portable monitoring system to synchronize the detected sensor measurement with data packets obtained from the backplane 404.

The portable monitoring system 840 can determine an operation status of the industrial machine 850 based on the received data characterizing sensor measurement and the received data characterizing one or more predetermined operating parameters. Determination of the operation status can involve arranging the sensor measurement data and the data received from the backplane 404 based on their detection time. In some implementations, an input monitoring circuit 842d can be detachably coupled to the secondary bus 844. The input monitoring circuit 842d can be configured to receive data characterizing sensor measurement from the sensor 860. The portable monitoring system 840 can also include a processing circuit 842c detachably coupled to the secondary bus 844. The processing circuit 842c can configured to determine an operation status (e.g., alarm associated with the condition monitoring, protection monitoring, etc.) of the industrial machine 850. The portable monitoring system can communicate the operation status of the machine 850 to one or more of a data collection system, a condition monitoring system, an authorized user, etc.

Other embodiments are within the scope and spirit of the disclosed subject matter. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Certain exemplary embodiments described above provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A portable monitoring system comprising:
a secondary bus;
a first monitoring circuit detachably coupled to the secondary bus, the first monitoring circuit configured to:
receive, from a first bus via a node comprising one or more gates, a first beacon packet of a monitoring system of an industrial machine,
wherein the first beacon packet includes a first system frame schedule indicative of a plurality of time slices during which a plurality of data packets are configured to be broadcasted on the first bus of the monitoring system;
determine, a first set of time slices of the plurality of time slices during which a first set of data packets including data characterizing one or more predetermined operating parameters are broadcasted on the first bus; and
transfer the first set of data packets from the first bus to the first monitoring circuit by activating the one or more gates in the node during a first set of time slices of the plurality of time slices,
wherein the one or more gates are configured to prevent transfer of an outgoing data packet to the first bus.

2. The portable monitoring system of claim 1, wherein the first monitoring circuit is further configured to set a second reference time of the portable monitoring system based on a first reference time of the monitoring system, wherein the plurality of time slices are temporally arranged relative to the first reference time.

3. The portable monitoring system of claim 2, wherein the first reference time of the monitoring system is included in the beacon packet.

4. The portable monitoring system of claim 1, wherein the plurality of data packets are broadcasted on the first bus by one or more monitoring circuits communicatively coupled to the first bus.

5. The portable monitoring system of claim 1, wherein the first set of data packets including data characterizing one or more predetermined operating parameters include unique identifiers indicative of the one or more predetermined operating parameter.

6. The portable monitoring system of claim 1, wherein activating the one or more gates in the node includes sending a control signal to the one or more gates, the control signal configured to set the one or more gates in a first operational mode in which data packets broadcasted on the first bus are transferred to the portable monitoring system.

7. The portable monitoring system of claim 1, wherein the one or more gates include a unidirectional data flow circuit, the unidirectional data flow circuit prevents transfer of the outgoing data packet to the first bus via the one or more gates.

8. The portable monitoring system of claim 1, further configured to receive data characterizing sensor measurement by one or more sensors coupled to the industrial machine, wherein the data characterizing sensor measurement includes a detected operational parameter value and time associated with the detected operational parameter.

9. The portable monitoring system of claim 8, further configured to determine an operation status of the industrial machine based on the received data characterizing sensor measurement and the received data characterizing one or more predetermined operating parameters.

10. The portable monitoring system of claim 1, further comprising:
an input monitoring circuit detachably coupled to the secondary bus is configured to receive data characterizing sensor measurement; and
a processing circuit detachably coupled to the secondary bus is configured to determine an operation status of the industrial machine.

11. A method comprising:
receiving, from a first bus via a node comprising one or more gates, a first beacon packet of a monitoring system of an industrial machine,
wherein the first beacon packet includes a first system frame schedule indicative of a plurality of time slices during which a plurality of data packets are configured to be broadcasted on the first bus of the monitoring system;
determining, a first set of time slices of the plurality of time slices during which a first set of data packets including data characterizing one or more predetermined operating parameters are broadcasted on the first bus; and
transferring the first set of data packets from the first bus to a monitoring circuit of a portable monitoring system by activating the one or more gates in the node during the first set of time slices of the plurality of time slices, wherein the one or more gates are configured to prevent transfer of an outgoing data packet to the first bus.

12. The method of claim 11, further comprising setting a second reference time of the portable monitoring system based on a first reference time of the monitoring system, wherein the plurality of time slices are temporally arranged relative to the first reference time.

13. The method of claim 12, wherein the first reference time of the monitoring system is included in the beacon packet.

14. The method of claim 11, wherein the plurality of data packets are broadcasted on the first bus by one or more monitoring circuits communicatively coupled to the first bus.

15. The method of claim 11, wherein the first set of data packets including data characterizing one or more predetermined operating parameters include unique identifiers indicative of the one or more predetermined operating parameter.

16. The method of claim 11, wherein activating the one or more gates in the node includes sending a control signal to the one or more gates, the control signal configured to set the one or more gates in a first operational mode in which data packets broadcasted on the first bus are transferred to the portable monitoring system.

17. The method of claim 11, wherein the one or more gates include a unidirectional data flow circuit, the unidirectional data flow circuit prevents transfer of the outgoing data packet to the first bus via the one or more gates.

18. The method of claim 11, further comprising receiving data characterizing sensor measurement by one or more sensors coupled to the industrial machine, wherein the data characterizing sensor measurement includes a detected operational parameter value and time associated with the detected operational parameter.

19. The method of claim 18, further comprising determining an operation status of the industrial machine based on the received data characterizing sensor measurement and the received data characterizing one or more predetermined operating parameters.

20. The method of claim 11, wherein the receiving, the determining and transferring is performed by the monitoring circuit in the portable monitoring system.

* * * * *